(12) United States Patent
Imanari et al.

(10) Patent No.: US 11,365,130 B2
(45) Date of Patent: Jun. 21, 2022

(54) POSITIVE ELECTRODE ACTIVE MATERIAL PRECURSOR FOR LITHIUM SECONDARY BATTERY, AND METHOD FOR MANUFACTURING POSITIVE ELECTRODE ACTIVE MATERIAL FOR LITHIUM SECONDARY BATTERY

(71) Applicants: SUMITOMO CHEMICAL COMPANY, LIMITED, Tokyo (JP); TANAKA CHEMICAL CORPORATION, Fukui (JP)

(72) Inventors: Yuichiro Imanari, Ehime (JP); Yusuke Maeda, Fukui (JP)

(73) Assignees: SUMITOMO CHEMICAL COMPANY, LIMITED, Tokyo (JP); TANAKA CHEMICAL CORPORATION, Fukui (JP)

( * ) Notice: Subject to any disclaimer, the term of this patent is extended or adjusted under 35 U.S.C. 154(b) by 0 days.

(21) Appl. No.: 16/344,283

(22) PCT Filed: Oct. 31, 2017

(86) PCT No.: PCT/JP2017/039279
§ 371 (c)(1),
(2) Date: Apr. 23, 2019

(87) PCT Pub. No.: WO2018/079816
PCT Pub. Date: May 3, 2018

(65) Prior Publication Data
US 2019/0270650 A1    Sep. 5, 2019

(30) Foreign Application Priority Data

Oct. 31, 2016 (JP) .............................. JP2016-213835

(51) Int. Cl.
*C01G 53/04* (2006.01)
*H01M 4/04* (2006.01)
(Continued)

(52) U.S. Cl.
CPC ............. *C01G 53/04* (2013.01); *C01G 53/00* (2013.01); *H01M 4/0471* (2013.01);
(Continued)

(58) Field of Classification Search
CPC ....... C01G 53/00; C01G 53/04; H01M 4/505; H01M 4/525; H01B 1/02
(Continued)

(56) References Cited

U.S. PATENT DOCUMENTS

| 2001/0010807 A1 | 8/2001 | Matsubara |
| 2003/0170540 A1 | 9/2003 | Ohzuku et al. |

(Continued)

FOREIGN PATENT DOCUMENTS

| CN | 1884089 A | * 12/2006 | ............. Y02E 10/10 |
| CN | 102280637 A | 12/2011 | |

(Continued)

OTHER PUBLICATIONS

International Search Report issued in corresponding International Patent Application No. PCT/JP2017/039279, dated Dec. 26, 2017, with English Translation.

(Continued)

*Primary Examiner* — Tri V Nguyen
(74) *Attorney, Agent, or Firm* — McDermott Will & Emery LLP

(57) ABSTRACT

The present invention provides a positive electrode active material precursor for a lithium secondary battery, in which the positive electrode active material precursor is represented by the following composition formula (I), a ratio ($\alpha/\beta$) between a half width $\alpha$ of a peak that is present within (Continued)

a range of a diffraction angle $2\theta=19.2\pm1°$ and a half width $\beta$ of a peak that is present within a range of $2\theta=38.5\pm1°$ is equal to or greater than 0.9 in powder X-ray diffraction measurement using a CuK$\alpha$ beam:

$$Ni_xCo_yMn_zM_w(OH)_2 \quad (I)$$

[$0.7\leq x<1.0$, $0<y\leq0.20$, $0\leq z\leq0.20$, $0\leq w\leq0.1$, and $x+y+z+w=1$ are satisfied, and M is one or more selected from the group consisting of Mg, Ca, Sr, Ba, Ti, Zr, V, Nb, Cr, Mo, W, Fe, Ru, Cu, Zn, B, Al, Ga, Si, Sn, P, and Bi].

3 Claims, 3 Drawing Sheets

(51) Int. Cl.
| | |
|---|---|
| *H01M 4/131* | (2010.01) |
| *H01M 4/1391* | (2010.01) |
| *H01M 4/505* | (2010.01) |
| *H01M 4/525* | (2010.01) |
| *H01M 10/0525* | (2010.01) |
| *C01G 53/00* | (2006.01) |
| *H01M 4/02* | (2006.01) |

(52) U.S. Cl.
CPC ......... *H01M 4/131* (2013.01); *H01M 4/1391* (2013.01); *H01M 4/505* (2013.01); *H01M 4/525* (2013.01); *H01M 10/0525* (2013.01); *C01P 2004/03* (2013.01); *C01P 2004/61* (2013.01); *H01M 2004/021* (2013.01)

(58) Field of Classification Search
USPC .................... 252/518.1, 519.1, 520.2, 520.3; 429/218.1, 223, 224
See application file for complete search history.

(56) References Cited

U.S. PATENT DOCUMENTS

| | | | |
|---|---|---|---|
| 2006/0138025 A1 | 6/2006 | Zones et al. | |
| 2011/0305954 A1 | 12/2011 | Kim et al. | |
| 2013/0108921 A1 | 5/2013 | Kase et al. | |
| 2013/0168600 A1* | 7/2013 | Niittykoski | H01M 4/525 252/182.1 |
| 2013/0189581 A1 | 7/2013 | Imaizumi et al. | |
| 2013/0302683 A1* | 11/2013 | Kang | H01M 10/052 429/220 |
| 2015/0010819 A1 | 1/2015 | Lee et al. | |
| 2015/0380737 A1 | 12/2015 | Kawasato et al. | |
| 2016/0164094 A1 | 6/2016 | Takei et al. | |
| 2016/0240846 A1 | 8/2016 | Endo et al. | |
| 2017/0309911 A1 | 10/2017 | Ryoshi et al. | |
| 2018/0047975 A1* | 2/2018 | Zhu | H01M 4/505 |

FOREIGN PATENT DOCUMENTS

| | | |
|---|---|---|
| CN | 103026537 A | 4/2013 |
| CN | 103325992 A | 9/2013 |
| CN | 105226266 A | 1/2016 |
| EP | 3534441 A1 | 9/2019 |
| JP | 09-268016 A | 10/1997 |
| JP | 10-310433 A | 11/1998 |
| JP | 2004-335278 A | 11/2004 |
| JP | 2005-089225 A | 4/2005 |
| JP | 2008-010434 A | 1/2008 |
| JP | 2015-018803 A | 1/2015 |
| JP | 2015-191848 A | 11/2015 |
| JP | 2016-110889 A | 6/2016 |
| JP | 2016-115658 A | 6/2016 |
| WO | 02/078105 A1 | 10/2002 |
| WO | 2012/011212 A1 | 1/2012 |
| WO | 2014/098238 A1 | 6/2014 |
| WO | 2015/001957 A1 | 1/2015 |
| WO | 2015/049862 A1 | 4/2015 |
| WO | 2016/067959 A1 | 5/2016 |
| WO | WO-2018012385 A1 * | 1/2018 ............ H01M 4/505 |

OTHER PUBLICATIONS

European Office Action Third Pary Observation issued in corresponding European Patent Application No. 17865065.1, dated Nov. 13, 2020.

Japanese Notice of Reasons for Refusal issued in corresponding Japanese Patent Application No. 2016-213835, dated Oct. 6, 2020, with English translation.

Extended European Search Report issued in corresponding European Patent Application No. 17865065.1-1106, dated Jun. 3, 2020.

Chinese Notification Information Statement issued in corresponding Chinese Patent Application No. 201780065611.6, dated Nov. 11, 2020, with partial English translation.

Japanese Notification Information Statement issued in corresponding Japanese Patent Application No. 2016-213835, dated Dec. 15, 2020, with partial English translation.

Chinese Office Action issued in corresponding Chinese Patent Application No. 201780065611.6, dated Jul. 2, 2021, with English translation.

Korean Office Action issued in corresponding Korean Patent Application No. 10-2019-7011665, dated Jan. 3, 2022, with English translation.

Chinese Office Action issued in corresponding Chinese Patent Application No. 201780065611.6, dated Mar. 15, 2022, with English translation.

\* cited by examiner

POSITIVE ELECTRODE ACTIVE MATERIAL PRECURSOR FOR LITHIUM SECONDARY BATTERY, AND METHOD FOR MANUFACTURING POSITIVE ELECTRODE ACTIVE MATERIAL FOR LITHIUM SECONDARY BATTERY

CROSS REFERENCE

This application is the U.S. National Phase under 35 U.S.C. § 371 of International Application No. PCT/JP2017/039279, filed on. Oct. 31, 2017, which claims the benefit of Japanese Application No. 2016-213835, filed on Oct. 31, 2016, the entire contents of each are hereby incorporated by reference.

TECHNICAL FIELD

The present invention relates to a positive electrode active material precursor for a lithium secondary battery and a method for manufacturing a positive electrode active material for a lithium secondary battery.

Priority is claimed on Japanese Patent Application No. 2016-213835, filed Oct. 31, 2016, the content of which is incorporated herein by reference.

BACKGROUND ART

A lithium-containing composite metal oxide has been used as a positive electrode active material for a lithium secondary battery. Practical use of lithium secondary batteries has already advanced not only for small-sized power sources for mobile phones and laptop PCs but also for intermediate and large-sized power sources for vehicles and electric power preservation.

As a positive electrode active material for a lithium secondary battery in the related art, attempts focusing on a crystallite size obtained on the basis of an X-ray diffraction pattern obtained by an X-ray diffraction method have been conducted. Patent Document 1 discloses a positive electrode active material for a nonaqueous electrolyte solution secondary battery, which is a lithium transition metal composite oxide represented as $Li_{1.00}Ni_{0.33}Co_{0.34}Mn_{0.33}O_2$, in which the BET specific surface area is 0.7 m²/g and the crystallite size in the vertical direction of a 104 surface obtained on the basis of an X-ray diffraction pattern obtained by the X-ray diffraction method is 800 Å.

According to Patent Document 1, the positive electrode active material for a lithium secondary battery is manufactured by manufacturing carbonates of cobalt, nickel, and manganese as a precursor of the positive electrode active material for a lithium secondary battery and mixing lithium borate into the carbonates.

CITATION LIST

Patent Literature

[Patent Document 1]
Japanese Unexamined Patent Application, First Publication No. 2004-335278

SUMMARY OF INVENTION

Technical Problem

The lithium secondary battery obtained by using the lithium-containing composite metal oxide in the related art as described above as a positive electrode active material is not sufficient to obtain a lithium secondary battery with high initial charging and discharging efficiency.

The present invention was made in view of such circumstances, and an object thereof is to provide a positive electrode active material precursor for a lithium secondary battery that is used for manufacturing a positive electrode active material that is useful for a lithium secondary battery that exhibits high initial charging and discharging efficiency and a method for manufacturing a positive electrode active material for a lithium secondary battery using the precursor.

Solution to Problem

That is, the present invention covers the following inventions [1] to [8].

[1] A positive electrode active material precursor for a lithium secondary battery, wherein the positive electrode active material precursor is represented by the following composition formula (I), a ratio (α/β) between a half width α of a peak that is present within a range of a diffraction angle 2θ=19.2±1° and a half width β of a peak that is present within a range of 2θ=38.5±1° is equal to or greater than 0.9 in powder X-ray diffraction measurement using a CuKα beam:

$Ni_xCo_yMn_zM_w(OH)_2$     (I)

[0.7≤x<1.0, 0<y≤0.20, 0≤z≤0.20, 0≤w≤0.1, and x+y+z+w=1 are satisfied, and M is one or more selected from the group consisting of Mg, Ca, Sr, Ba, Ti, Zr, V, Nb, Cr, Mo, W, Fe, Ru, Cu, Zn, B, Al, Ga, Si, Sn, P, and Bi].

[2] The positive electrode active material precursor for a lithium secondary battery according to [1], wherein the ratio (α/β) is equal to or less than 1.3.

[3] The positive electrode active material precursor for a lithium secondary battery according to [1] or [2], wherein the half width β of the peak that is present within the range of 2θ=38.5±1° is equal to or greater than 0.35 and equal to or less than 1.0.

[4] The positive electrode active material precursor for a lithium secondary battery according to any one of [1] to [3], wherein a secondary particle diameter is equal to or greater than 7 μm and equal to or less than 13 μm.

[5] The positive electrode active material precursor for a lithium secondary battery according to any one of [1] to [4], wherein a BET specific surface area is equal to or greater than 5 m²/g and equal to or less than 50 m²/g.

[6] The positive electrode active material precursor for a lithium secondary battery according to any one of [1] to [5], wherein tap bulk density is equal to or greater than 1.0 g/cm³ and equal to or less than 2.1 g/cm³.

[7] A method for manufacturing a positive electrode active material for a lithium secondary battery including:
a process of obtaining a mixture by mixing the positive electrode active material precursor for a lithium secondary battery according to any one of [1] to [6] with a lithium compound; and
a process of burning the mixture.

[8] The method for manufacturing a positive electrode active material for a lithium secondary battery according to [7], wherein the positive electrode active material for a lithium secondary battery is represented by the following composition formula (II):

$Li[Li_a(Ni_xCo_yMn_zM_w)_{1-a}]O_2$     (II)

(−0.1≤a≤0.1, 0.7≤x<1.0, 0<y≤0.20, 0≤z≤0.20, 0≤w≤0.1, and x+y+z+w=1 are satisfied, and M is one or more selected from the group consisting of Mg, Ca, Sr, Ba, Ti, Zr, V, Nb, Cr, Mo, W, Fe, Ru, Cu, Zn, B, Al, Ga, Si, Sn, P, and Bi).

Advantageous Effects of Invention

The invention can provide a positive electrode active material precursor for a lithium secondary battery that is used for manufacturing a positive electrode active material that is useful for a lithium secondary battery that exhibits high initial charging and discharging efficiency and a method for manufacturing a positive electrode active material for a lithium secondary battery using the precursor.

DESCRIPTION OF EMBODIMENTS

Figure 1A:
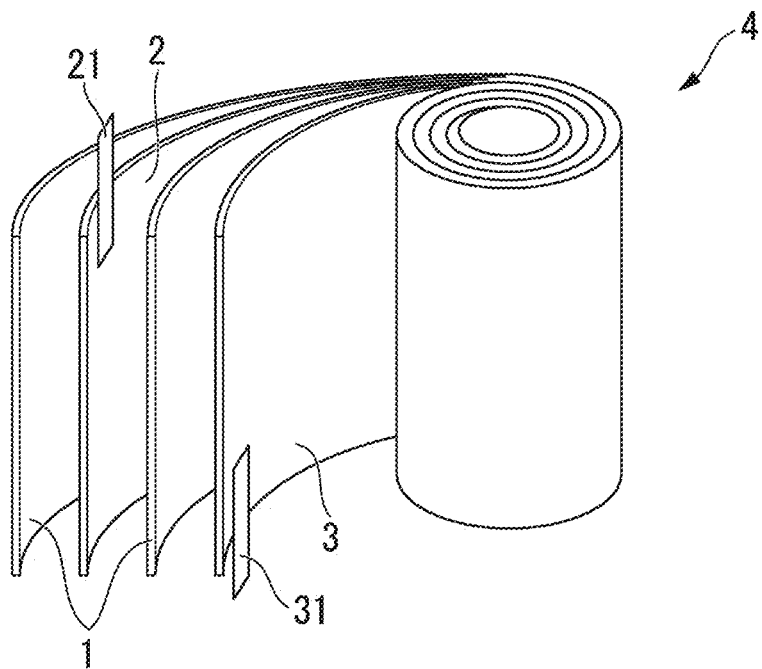
FIG. 1A is an outline configuration diagram showing an example of a lithium ion secondary battery.

<Positive Electrode Active Material Precursor for Lithium Secondary Battery>

According to an embodiment of the invention, there is provided a positive electrode active material precursor for a lithium secondary battery (hereinafter, also referred to as a "precursor"), wherein the positive electrode active material precursor is represented by the following composition formula (I), a ratio ($\alpha/\beta$) between a half width $\alpha$ of a peak that is present within a range of a diffraction angle $2\theta=19.2\pm1°$ and a half width $\beta$ of a peak that is present within a range of $2\theta=38.5\pm1°$ is equal to or greater than 0.9 in powder X-ray diffraction measurement using a CuKα beam:

$$Ni_xCo_yMn_zM_w(OH)_2 \quad (I)$$

[$0.7 \leq x < 1.0$, $0 < y \leq 0.20$, $0 \leq z \leq 0.20$, $0 \leq w \leq 0.1$, and $x+y+z+w=1$ are satisfied, and M is one or more selected from the group consisting of Mg, Ca, Sr, Ba, Ti, Zr, V, Nb, Cr, Mo, W, Fe, Ru, Cu, Zn, B, Al, Ga, Si, Sn, P, and Bi].

In the embodiment, the ratio ($\alpha/\beta$) is equal to or greater than 0.9, is preferably equal to or greater than 0.91, and is more preferably equal to or greater than 0.92. Also, the ratio ($\alpha/\beta$) is preferably equal to or less than 1.3, is more preferably equal to or less than 1.28, and is particularly preferably equal to or less than 1.26.

The aforementioned upper limit values and lower limit values can be arbitrarily combined.

For example, the ratio ($\alpha/\beta$) is preferably equal to or greater than 0.9 and equal to or less than 1.3, is more preferably equal to or greater than 0.91 and equal to or less than 1.28, and is further preferably equal to or greater than 0.92 and equal to or less than 1.26.

If the ratio ($\alpha/\beta$) falls within the aforementioned specific range in the embodiment, it is considered that particles will grow regularly when a precursor and a lithium compound are mixed and burned. Therefore, it is expected to be possible to obtain a precursor of a positive electrode active material that is useful for a lithium secondary battery that exhibits high initial charging and discharging efficiency.

In the embodiment, the half width $\alpha$ is preferably equal to or greater than 0.35, is more preferably equal to or greater than 0.4, and is particularly preferably equal to or greater than 0.45.

Also, the half width $\alpha$ is preferably equal to or less than 1.0, is more preferably equal to or less than 0.95, and is particularly preferably equal to or less than 0.9.

The aforementioned upper limit values and lower limit values can be arbitrarily combined.

For example, the half width $\alpha$ is preferably equal to or greater than 0.35 and equal to or less than 1.0, is more preferably equal to or greater than 0.4 and equal to or less than 0.95, and is further preferably equal to or greater than 0.45 and equal to or less than 0.9.

In the embodiment, the half width $\beta$ is preferably equal to or greater than 0.35, is more preferably equal to or greater than 0.4, and is particularly preferably equal to or greater than 0.45.

Also, the half width $\beta$ is preferably equal to or less than 1.0, is more preferably equal to or less than 0.9, and is particularly preferably equal to or less than 0.8.

The aforementioned upper limit values and lower limit values can be arbitrarily combined.

For example, the half width $\beta$ is preferably equal to or greater than 0.35 and equal to or less than 1.0, is more preferably equal to or greater than 0.4 and equal to or less than 0.9, and is further preferably equal to or greater than 0.45 and equal to or less than 0.8.

In the embodiment, the half width $\alpha$ of the peak that is present within the range of the diffraction angle $2\theta=19.2\pm1°$ (hereinafter, also referred to as a "peak A") and the half width $\beta$ of the peak that is present within the range of $2\theta=38.5\pm1°$ (hereinafter, also referred to as a "peak B") can be calculated by the following method.

First, powder X-ray diffraction measurement, using Cu-Kα as a beam source, in which a measurement range of the diffraction angle $2\theta$ is equal to or greater than $10°$ and equal to or less than $90°$, is performed on the precursor, and peaks corresponding to the peak A and the peak B are decided. Next, each profile of each diffraction peak is approximated with a Gaussian function, and a difference of $2\theta$ between two points at which a value of a secondary differential curve becomes zero is multiplied by $2 \ln 2$ ($\approx 1.386$) that is a coefficient, thereby calculating the half width $\alpha$ and the half width $\beta$ (for example, see "Actual Situations of Powder X-ray Analysis—Introduction of Rietveld Method," Vol. 7 issued on Jun. 20, 2006, written by Izumi Nakai and Fujio Izumi).

In the embodiment, the precursor is represented by the following composition formula (I):

$$Ni_xCo_yMn_zM_w(OH)_2 \quad (I)$$

[$0.7 \leq x < 1.0$, $0 < y \leq 0.20$, $0 \leq z \leq 0.20$, $0 \leq w \leq 0.1$, and $x+y+z+w=1$ are satisfied, and M is one or more selected from the group consisting of Mg, Ca, Sr, Ba, Ti, Zr, V, Nb, Cr, Mo, W, Fe, Ru, Cu, Zn, B, Al, Ga, Si, Sn, P, and Bi].

From the viewpoint that it is possible to obtain a lithium secondary battery with high reversible capacitance, x in the aforementioned composition formula (I) is preferably equal to or greater than 0.7, is more preferably equal to or greater than 0.74, and is particularly preferably equal to or greater than 0.78. Also, from the viewpoint that it is possible to obtain a lithium secondary battery with higher initial charging and discharging efficiency, x is preferably less than 1.0, is more preferably equal to or less than 0.99, and is particularly preferably equal to or less than 0.95.

The upper limit values and the lower limit values of x can be arbitrarily combined.

For example, x is preferably equal to or greater than 0.7 and less than 1.0, is more preferably equal to or greater than 0.74 and equal to or less than 0.99, and is further preferably equal to or greater than 0.78 and equal to or less than 0.95.

Also, from the viewpoint that it is possible to obtain a lithium secondary battery with low battery resistance, y in the aforementioned composition formula (I) is preferably greater than 0, is more preferably equal to or greater than 0.01, and is further preferably equal to or greater than 0.05. Also, from the viewpoint that it is possible to obtain a lithium secondary battery with high thermal stability, y is preferably equal to or less than 0.20, is more preferably equal to or less than 0.19, and is further preferably equal to or less than 0.18.

The upper limit values and the lower limit values of y can be arbitrarily combined.

For example, y is preferably greater than 0 and equal to or less than 0.20, is more preferably equal to or greater than 0.01 and equal to or less than 0.19, and is further preferably equal to or greater than 0.05 and equal to or less than 0.18.

Also, from the viewpoint that it is possible to obtain a lithium secondary battery with high thermal stability, z in the aforementioned composition formula (I) is preferably equal to or greater than 0, is more preferably equal to or greater than 0.01, and is further preferably equal to or greater than 0.05. In addition, from the viewpoint that it is possible to obtain a lithium secondary battery with high preservation properties at a high temperature (in an environment of 60° C., for example), z in the aforementioned composition formula (I) is preferably equal to or less than 0.20, is more preferably equal to or less than 0.19, and is further preferably equal to or less than 0.18. The upper limit values and the lower limit values of z can be arbitrarily combined.

For example, z is preferably equal to or greater than 0 and equal to or less than 0.20, is more preferably equal to or greater than 0.01 and equal to or less than 0.19, and is further preferably equal to or greater than 0.05 and equal to or less than 0.18.

Also, from the viewpoint that it is possible to obtain a lithium secondary battery with low battery resistance, w in the aforementioned composition formula (I) is preferably equal to or greater than 0, is more preferably equal to or greater than 0.0001, and is further preferably equal to or greater than 0.0005. In addition, from the viewpoint that it is possible to obtain a lithium secondary battery with high discharging capacitance at a high current rate, w in the aforementioned composition formula (I) is preferably equal to or less than 0.1, is more preferably equal to or less than 0.09, and is further preferably equal to or less than 0.08.

The upper limit values and the lower limit values of w can be arbitrarily combined.

For example, w is preferably equal to or greater than 0 and equal to or less than 0.1, is more preferably equal to or greater than 0.0001 and equal to or less than 0.09, and is further preferably equal to or greater than 0.0005 and equal to or less than 0.08.

M in the aforementioned composition formula (I) is one or more elements selected from the group consisting of Mg, Ca, Sr, Ba, Ti, Zr, V, Nb, Cr, Mo, W, Fe, Ru, Cu, Zn, B, Al, Ga, Si, Sn, P, and Bi.

Also, from the viewpoint that it is possible to obtain a lithium secondary battery with high cycle properties, M in the composition formula (I) is preferably one or more selected from the group consisting of Ti, Mg, Al, W, B, Zr, and Sn, and from the viewpoint that it is possible to obtain a lithium secondary battery with high thermal stability, M is preferably one or more selected from the group consisting of Al, W, B, Zr, and Sn.

(Secondary Particle Diameter)

In the embodiment, the precursor includes secondary particles formed by aggregation of primary particles. The primary particles are minimum units that are observed as independent particles through SEM, and the particles are single crystal or polycrystal in which crystallite gathers. The secondary particles are particles that are formed by gathering primary particles and can be observed through SEM observation or a laser diffraction scattering method, which will be described later.

In the embodiment, the secondary particle diameter of the precursor is preferably equal to or greater than 7 μm, is more preferably equal to or greater than 8 μm, and is further preferably equal to or greater than 9 μm. Also, the secondary particle diameter is preferably equal to or less than 13 μm, is more preferably equal to or less than 12 μm, and is further preferably equal to or less than 11 μm.

The upper limit values and the lower limit values of the secondary particle diameter can be arbitrarily combined.

For example, the secondary particle diameter of the precursor is preferably equal to or greater than 7 μm and equal to or greater than 13 μm, is more preferably equal to or greater than 8 μm and equal to or less than 12 μm, and is further preferably equal to or greater than 9 μm and equal to or less than 11 μm.

In the embodiment, the "secondary particle diameter" of the precursor indicates a value measured by the following method (laser diffraction scattering method).

A laser diffraction particle size distribution meter (manufactured by Horiba Ltd. model No.: LA-950) is used, 0.1 g of precursor powder is poured into 50 ml of aqueous solution of 0.2% by mass of sodium hexamethaphosphate, thereby obtaining a dispersion with the powder dispersed therein. Particle size distribution of the obtained dispersion is measured, and a volume-based cumulative particle size distribution curve is obtained. A value of a particle diameter (D50) of the obtained cumulative particle size distribution curve seen from the side of fine particles at the time of 50% accumulation is assumed to be a secondary particle diameter of the precursor powder.

(BET Specific Surface Area)

In the embodiment, the BET specific surface area of the precursor is preferably equal to or greater than 5 $m^2/g$, is more preferably equal to or greater than 10 $m^2/g$, and is particularly preferably equal to or greater than 15 $m^2/g$.

Further, the BET specific area of the precursor is preferably equal to or less than 50 $m^2/g$, is more preferably equal to or less than 45 $m^2/g$, and is particularly preferably equal to or less than 40 $m^2/g$.

The upper limit values and the lower limit values of the BET specific surface area can be arbitrarily combined.

For example, the BET specific surface area of the precursor is preferably equal to or greater than 5 $m^2/g$ and equal to or less than 50 $m^2/g$, is more preferably equal to or greater than 10 $m^2/g$ and equal to or less than 45 $m^2/g$, and is further preferably equal to or greater than 15 $m^2/g$ and equal to or less than 40 $m^2/g$.

Note that the BET specific surface area can be measured using an automatic specific surface area measurement device.

(Tap Bulk Density of Precursor)

In the embodiment, the tap bulk density of the precursor is preferably equal to or greater than 1.0 g/cm$^3$, is more preferably equal to or greater than 1.2 g/cm$^3$, and is particularly preferably equal to or greater than 1.4 g/cm$^3$ from the viewpoint that it is possible to obtain a lithium secondary battery with high electrode density. Also, from the viewpoint of enhancing reactivity during burning when the mixture obtained by mixing the precursor with a lithium compound is burned, the tap bulk density is preferably equal to or less than 2.1 g/cm$^3$, is more preferably equal to or less than 2.0 g/cm$^3$, and is particularly preferably equal to or less than 1.9 g/cm$^3$.

The upper limit values and the lower limit values of the tap bulk density can be arbitrarily combined.

For example, the tap bulk density is preferably equal to or greater than 1.0 g/cm$^3$ and equal to or less than 2.1 g/cm$^3$, is more preferably equal to or greater than 1.2 g/cm$^3$ and equal to or less than 2.0 g/cm$^3$, and is further preferably equal to or greater than 1.4 g/cm$^3$ and equal to or less than 1.9 g/cm$^3$.

The tap bulk density can be measured on the basis of JIS R 1628-1997.

<Method for Manufacturing Positive Electrode Active Material for Lithium Secondary Battery>

The method for manufacturing a positive electrode active material for a lithium secondary battery according to the embodiment is preferably a manufacturing method that includes the following processes (2) and (3) as essential processes and includes the following (1), (2), and (3) in this order:

(1) a process of manufacturing a positive electrode active material precursor for a lithium secondary battery;

(2) a mixing process of mixing the precursor with a lithium compound, thereby obtaining a mixture; and (3) a burning process of burning the mixture.

[Method for Manufacturing Positive Electrode Active Material Precursor for Lithium Secondary Battery]

In the method for manufacturing a positive electrode active material for a lithium secondary battery according to the embodiment, it is preferable that a nickel-containing metal composite compound that includes a metal other than lithium, that is, nickel as an essential metal and cobalt, manganese, and aluminum as arbitrary metals, be first prepared, and that the nickel-containing metal composite compound be burned with an appropriate lithium salt. The nickel-containing metal composite compound that is a precursor is not particularly limited as long as the compound is the positive electrode active material precursor for a lithium secondary battery according to the aforementioned embodiment, and a nickel-containing metal composite hydroxide or a nickel-containing metal composite oxide can be used.

The precursor can be typically manufactured by a known batch-type coprecipitation method or a successive coprecipitation method. Hereinafter, a nickel-containing metal composite hydroxide including nickel, cobalt, manganese, and aluminum (hereinafter, also referred to as a "metal composite hydroxide") will be provided as exemplary examples of a metal, and a manufacturing method thereof will be described in detail.

First, a nickel salt solution, a cobalt salt solution, a manganese salt solution, an aluminum salt solution, and a complexing agent are caused to react by the successive coprecipitation method described in Japanese Unexamined Patent Application, First Publication No. 2002-201028, thereby manufacturing a composite hydroxide represented as $Ni_sCo_tMn_uAl_v(OH)_2$ (in the formula, s+t+u+v=1).

Although the nickel salt that is a solute of the aforementioned nickel salt solution is not particularly limited, any of nickel sulfate, nickel nitrate, nickel chloride, and nickel acetate, for example, can be used.

As the cobalt salt that is a solute of the aforementioned cobalt salt solution, any of cobalt sulfate, cobalt nitrate, cobalt chloride, and cobalt acetate, for example, can be used.

As the manganese salt that is a solute of the aforementioned manganese salt solution, any of manganese sulfate, manganese nitrate, manganese chloride, and manganese acetate, for example, can be used.

As the aluminum salt that is a solute of the aforementioned aluminum salt solution, aluminum sulfate, for example, can be used.

The aforementioned metal salts are used at proportions corresponding to the composition ratios of the aforementioned $Ni_sCo_tMn_uAl_v(OH)_2$. Also, water is used as a solvent.

That is, the amounts of the respective metal salts are defined such that molar ratios of nickel, cobalt, manganese, and aluminum in the mixture solution including the aforementioned metal salts satisfy s:t:u:v.

The complexing agent can form a complex with ions of nickel, cobalt, and manganese in an aqueous solution, and examples thereof include an ammonium ion donor (such as ammonium sulfate, ammonium chloride, ammonium carbonate, ammonium fluoride), hydrazine, ethylenediaminetetraacetic acid, nitrilotriacetic acid, uracil diacetate, and glycine.

During precipitation, an alkali aqueous solution (for example, sodium hydroxide or potassium hydroxide) is added as needed in order to adjust a pH value of the aqueous solution. In the embodiment, it is possible to control the half width ratio of the precursor within the specific range of the embodiment by adjusting the pH value of the aqueous solution.

The inside of a reaction tank may be an inert atmosphere. If the inside of the reaction tank is an inert atmosphere, it is possible to inhibit aggregation of an element that is more easily oxidized than nickel and to obtain a uniform metal composite hydroxide.

Also, the inside of the reaction tank may be maintained as an inert atmosphere and an excessive oxygen-containing atmosphere or in presence of an oxidant. This is for facilitating control of the form of the metal composite hydroxide by oxidizing the transition metal to an appropriate extent. It is only necessary for oxygen in oxygen-containing gas or the oxidant to contain sufficient oxygen atoms for oxidizing the transition metal. If a large amount of oxygen atoms are not introduced, it is possible to maintain the inert atmosphere in the reaction tank. Note that in a case in which the atmosphere in the reaction tank is controlled depending on the type of gas, a predetermined type of gas may be distributed into the reaction tank, or direct bubbling of a reaction solution may be performed.

After the aforementioned reaction, the thus obtained reaction precipitate is washed and dried, thereby isolating nickel, cobalt, manganese, aluminum hydroxide as a nickel, cobalt, manganese, aluminum composite compound.

For the aforementioned isolation, a method of dehydrating a slurry (coprecipitated slurry) including the reaction precipitate through centrifugation, suction filtration, or the like is preferably used.

The coprecipitate obtained through the dehydration is preferably washed with water or a washing solution including an alkali. In the embodiment, the coprecipitate is preferably washed with the washing solution including an alkali and is more preferably washed with a sodium hydroxide solution. Also, the coprecipitate may be washed using a washing solution containing the element sulfur.

Note that, although the nickel, cobalt, manganese, aluminum composite hydroxide is manufactured in the aforementioned example, a nickel, cobalt, manganese, aluminum composite oxide may be prepared.

In the embodiment, it is possible to control the half widths of the precursor within the specific range of the embodiment depending on reaction conditions such as concentration of metal salts to be supplied to the reaction tank, the amount of the complexing agent to be added, a stirring speed, a reaction temperature, reaction pH, the amount of oxygen-containing gas to be introduced, the amount of the oxidant to be added, burning conditions, which will be described later, and the like.

More specifically, it is possible to control the particle diameter and to set the half width ratio of the precursor within the specific range of the invention by adjusting the reaction pH. If the reaction pH is reduced, the half widths tend to be reduced. Also, it is possible to set the half width ratio of the precursor within the specific range of the embodiment by adjusting the amount of the oxygen-containing gas to be introduced, in addition to the adjustment of the reaction pH.

[Mixing Process]

This process is a process of mixing a lithium compound with the precursor, thereby obtaining a mixture.

Lithium Compound

As the lithium compound that is used in the embodiment, any one of lithium carbonate, lithium nitrate, lithium acetate, lithium hydroxide, lithium oxide, lithium chloride, and lithium fluoride can be used, or two or more thereof can be mixed and used. Among them, any one of or both lithium hydroxide and lithium carbonate are preferably used.

Also, in a case in which the lithium compound includes lithium carbonate as impurities, the amount of the lithium carbonate in lithium hydroxide is preferably equal to or less than 5% by mass.

A method of mixing the precursor with the lithium compound will be described.

After the precursor is dried, the precursor is mixed with the lithium compound. Although drying conditions are not particularly limited, any of conditions under which the precursor is neither oxidized nor reduced (specifically, conditions under which oxides or hydroxides are dried), conditions under which the precursor is oxidized (specifically, drying conditions under which the hydroxide is oxidized into an oxide), and conditions under which the precursor is reduced (specifically, drying conditions under which the oxide is reduced into a hydroxide), for example, may be used.

For the conditions under which the precursor is neither oxidized nor reduced, it is only necessary to use an inert gas such as nitrogen, helium, or argon, and for the conditions under which the hydroxide is oxidized, the oxidation may be performed using oxygen or air.

Also, as the conditions under which the precursor is reduced, a reducing agent such as hydrazine or sodium sulfite may be used in an atmosphere of an inert gas.

After the precursor is dried, classification may be appropriately performed.

The aforementioned lithium compound and the precursor are mixed in consideration of a composition ratio of a final target product. For example, in a case in which nickel, cobalt, manganese, aluminum composite hydroxide is used, the lithium compound and the composite metal hydroxide are mixed at a proportion corresponding to the composition ratio of $Li[Li_r(Ni_sCo_tMn_uAl_v)_{1-r}]O_2$ (in the formula, s+t+u+v=1). A lithium-nickel, cobalt, manganese, aluminum composite oxide is obtained by burning the mixture of the nickel, cobalt, manganese, aluminum composite metal hydroxide and the lithium compound in a later burning process.

From the viewpoint that it is possible to obtain a uniform lithium-nickel, cobalt, manganese, aluminum composite oxide, r is preferably greater than 0, is more preferably equal to or greater than 0.01, and is further preferably equal to or greater than 0.02. Also, from the viewpoint that it is possible to obtain a lithium-nickel, cobalt, manganese, aluminum composite oxide with high purity, r is preferably equal to or less than 0.1, is more preferably equal to or less than 0.08, and is further preferably equal to or less than 0.06.

The upper limit values and the lower limit values of r described above can be arbitrarily combined.

[Burning Process]

The burning temperature of the mixture of the aforementioned lithium compound and the precursor is preferably equal to or greater than 600° C. and is more preferably equal to or greater than 650° C. from the viewpoint of enhancing charging capacitance. Also, from the viewpoint that it is possible to prevent lithium from being volatilized and to obtain a lithium nickel composite oxide with a target composition, the burning temperature is preferably equal to or less than 1000° C. and is more preferably equal to or less than 950° C.

The aforementioned upper limit values and lower limit values of the burning temperature can be arbitrarily combined.

For example, the burning temperature is preferably within a range of equal to or greater than 600° C. and equal to or less than 1000° C. and is more preferably within a range of equal to or greater than 650° C. and equal to or less than 950° C.

By setting the burning temperature within the range of equal to or greater than 650° C. and equal to or less than 950° C., it is possible to produce a lithium nickel composite oxide that exhibits particularly high charging and discharging efficiency and excellent cycle properties. As for the burning time, the total time until holding of the temperature ends after a temperature rise is started and a target temperature is reached is preferably set to be equal to or greater than 1 hour and equal to or less than 30 hours. If the total time is equal to or less than 30 hours, it is possible to prevent Li from being volatilized and to prevent battery performance from being degraded.

If the total time is equal to or greater than 1 hour, development of crystal satisfactorily advances, and it is possible to improve the battery performance.

Note that it is also effective to perform temporary burning before the aforementioned burning. The temporary burning is preferably performed within a temperature range of equal to or greater than 300° C. and equal to or less than 900° C. for a period of time of equal to or greater than 0.5 hours and equal to or less than 10 hours. By performing the temporary burning, it may be possible to shorten the burning time. Also, atmospheric air, dried air, an oxygen atmosphere, an inert atmosphere, or the like is used in accordance with a desired composition, and a plurality of heating processes are performed as needed.

The "start of the temperature rise" in the embodiment means a timing at which the temperature rise for the temporary burning starts in a case in which the temporary burning is performed and also means a timing at which the temperature rise for an initial heating process starts in a case in which a plurality of heating processes are included.

The lithium nickel composite oxide obtained through the burning is appropriately classified after pulverization, thereby obtaining a positive electrode active material for a lithium secondary battery that can be applied to a lithium secondary battery.

<Positive Electrode Active Material for Lithium Secondary Battery>

The positive electrode active material for a lithium secondary battery manufactured by the aforementioned method for manufacturing a positive electrode active material for a lithium secondary battery according to the invention preferably includes a substance represented by the following Formula (II):

$$\text{Li}[\text{Li}_a(\text{Ni}_x\text{Co}_y\text{Mn}_z\text{M}_w)_{1-a}]\text{O}_2 \quad (II)$$

($-0.1 \leq a \leq 0.1$, $0.7 \leq x < 1.0$, $0 < y \leq 0.20$, $0 \leq z \leq 0.20$, $0 \leq w \leq 0.1$, and $x+y+z+w=1$ are satisfied, and M is one or more selected from the group consisting of Mg, Ca, Sr, Ba, Ti, Zr, V, Nb, Cr, Mo, W, Fe, Ru, Cu, Zn, B, Al, Ga, Si, Sn, P, and Bi).

From the viewpoint that it is possible to obtain a lithium secondary battery with higher initial charging and discharging efficiency, a in the aforementioned composition formula (II) is preferably greater than 0, is more preferably equal to or greater than 0.01, and is further preferably equal to or greater than 0.02. Also, a is preferably less than 0.1, is more preferably equal to or less than 0.08, and is further preferably equal to or less than 0.06.

The upper limit values and the lower limit values of a can be arbitrarily combined.

For example, a is preferably greater than 0 and less than 0.1, is more preferably equal to or greater than 0.01 and equal to or less than 0.08, and is further preferably equal to or greater than 0.02 and equal to or less than 0.06.

From the viewpoint that it is possible to obtain a lithium secondary battery with high reversible capacitance, x in the aforementioned composition formula (II) is preferably equal to or greater than 0.7, is more preferably equal to or greater than 0.74, and is particularly preferably equal to or greater than 0.78. Also, from the viewpoint that it is possible to obtain a lithium secondary battery with higher initial charging and discharging efficiency, x is preferably less than 1.0, is more preferably equal to or less than 0.99, and is particularly preferably equal to or less than 0.95.

The upper limit values and the lower limit values of x can be arbitrarily combined.

For example, x is preferably equal to or greater than 0.7 and less than 1.0, is more preferably equal to or greater than 0.74 and equal to or less than 0.99, and is further preferably equal to or greater than 0.78 and equal to or less than 0.95.

From the viewpoint that it is possible to obtain a lithium secondary battery with low battery resistance, y in the aforementioned composition formula (II) is preferably greater than 0, is more preferably equal to or greater than 0.01, and is further preferably equal to or greater than 0.05. Also, from the viewpoint that it is possible to obtain a lithium secondary battery with high thermal stability, y is preferably equal to or less than 0.20, is more preferably equal to or less than 0.19, and is further preferably equal to or less than 0.18.

The upper limit values and the lower limit values of y can be arbitrarily combined.

For example, y is preferably greater than 0 and equal to or less than 0.20, is more preferably equal to or greater than 0.01 and equal to or less than 0.19, and is further preferably equal to or greater than 0.05 and equal to or less than 0.18.

From the viewpoint that it is possible to obtain a lithium secondary battery with high thermal stability, z in the aforementioned composition formula (II) is preferably equal to or greater than 0, is more preferably equal to or greater than 0.01, and is further preferably equal to or greater than 0.05. Also, from the viewpoint that it is possible to obtain a lithium secondary battery with high preservation properties at a high temperature (in an environment of 60° C., for example), z is preferably equal to or less than 0.20, is more preferably equal to or less than 0.19, and is further preferably equal to or less than 0.18.

The upper limit values and the lower limit values of z can be arbitrarily combined.

For example, z is preferably equal to or greater than 0 and equal to or less than 0.20, is more preferably equal to or greater than 0.01 and equal to or less than 0.19, and is further preferably equal to or greater than 0.05 and equal to or less than 0.18.

From the viewpoint that it is possible to obtain a lithium secondary battery with low battery resistance, w in the aforementioned composition formula (II) is preferably equal to or greater than 0, is more preferably equal to or greater than 0.0001, and is further preferably equal to or greater than 0.0005. Also, from the viewpoint that it is possible to obtain a lithium secondary battery with high discharging capacitance at a high current rate, w is preferably equal to or less than 0.1, is more preferably equal to or less than 0.09, and is further preferably equal to or less than 0.08.

The upper limit values and the lower limit values of w can be arbitrarily combined.

For example, w is preferably equal to or greater than 0 and equal to or less than 0.1, is more preferably equal to or greater than 0.0001 and equal to or less than 0.09, and is further preferably equal to or greater than 0.0005 and equal to or less than 0.08.

M in the aforementioned composition formula (II) is one or more selected from the group consisting of Mg, Ca, Sr, Ba, Ti, Zr, V, Nb, Cr, Mo, W, Fe, Ru, Cu, Zn, B, Al, Ga, Si, Sn, P, and Bi.

Also, from the viewpoint that it is possible to obtain a lithium secondary battery with high cycle properties, M in the composition formula (II) is preferably one or more kind selected from the group consisting of Ti, Mg, Al, W, B, Zr, and Sn. From the viewpoint that it is possible to obtain a lithium secondary battery with high thermal stability, M is preferably one or more selected from the group consisting of Al, W, B, Zr, and Sn.

(Layered Structure)

A crystal structure of the positive electrode active material for a lithium secondary battery is a layered structure and is more preferably a hexagonal crystal structure or a monoclinic crystal structure.

The hexagonal crystal structure is attributable to any one of space groups selected from the group consisting of P3, P3$_1$, P3$_2$, R3, P-3, R-3, P312, P321, P3$_1$12, P3$_1$21, P3$_2$12, P3$_2$21, R32, P3m1, P31m, P3c1, P31c, R3m, R3c, P-31m, P-31c, P-3m1, P-3c1, R-3m, R-3c, P6, P6$_1$, P6$_5$, P6$_2$, P6$_4$, P6$_3$, P-6, P6/m, P6$_3$/m, P622, P6$_1$22, P6$_5$22, P6$_2$22, P6$_4$22, P6$_3$22, P6 mm, P6cc, P6$_3$ cm, P6$_3$mc, P-6m2, P-6c2, P-62m, P62c, P6/mmm, P6/mcc, P6$_3$/mcm, and P6$_3$/mmc.

Also, the monoclinic crystal structure is attributable to any one of space groups selected from the group consisting of P2, P2$_1$, C2, Pm, Pc, Cm, Cc, P2/m, P2$_1$/m, C2/m, P2/c, P2$_1$/c, and C2/c.

Among them, the crystal structure is particularly preferably a hexagonal crystal structure that is attributable to the space group R-3m or a monoclinic crystal structure that is attributable to C2/m from the viewpoint that it is possible to obtain a lithium secondary battery with high charging capacitance.

<Lithium Secondary Battery>

Next, a positive electrode using the positive electrode active material for a lithium secondary battery according to the invention as a positive electrode active material for a lithium secondary battery and a lithium secondary battery having the positive electrode will be described while describing a configuration of the lithium secondary battery.

In one example, the lithium secondary battery according to the embodiment has a positive electrode and a negative electrode, a separator interposed between the positive electrode and the negative electrode, and an electrolyte solution disposed between the positive electrode and the negative electrode.

Figure 1B:
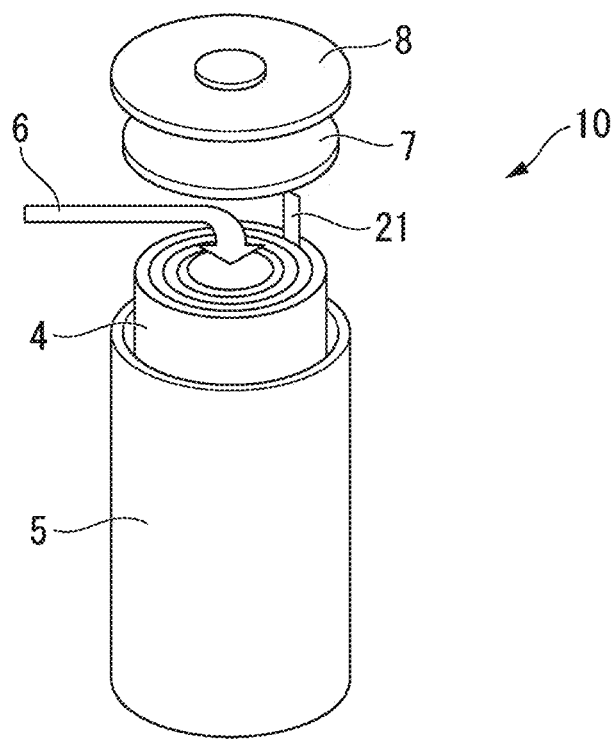
FIG. 1B is an outline configuration diagram showing an example of the lithium ion secondary battery.

FIGS. 1A and 1B are schematic diagrams showing an example of the lithium secondary battery according to the embodiment. A cylindrical lithium secondary battery 10 according to the embodiment is manufactured as follows.

First, as shown in FIG. 1A, a pair of separators 1 with belt shapes, a positive electrode 2 with a belt shape that has a positive electrode lead 21 at one end, and a negative electrode 3 with a belt shape that has a negative electrode lead 31 at one end are laminated in an order of the separator 1, the positive electrode 2, the separator 1, and the negative electrode 3 and are wound, thereby obtaining an electrode group 4.

Next, as shown in FIG. 1B, the electrode group 4 and an insulator, which is not shown in the drawing, are accommodated in a battery case 5, a case bottom is sealed, an electrolyte solution 6 is caused to be impregnated in the electrode group 4, and the electrolyte solution is disposed between the positive electrode 2 and the negative electrode 3. It is possible to manufacture the lithium secondary battery 10 by further sealing an upper portion of the battery case 5 with a top insulator 7 and a sealing body 8.

Examples of the shape of the electrode group 4 include columnar shapes with sectional shapes that are a circle, an oval, a rectangle, and a rectangle with rounded corners when the electrode group 4 is cut in the vertical direction with respect to an axis of the winding.

Also, as the shape of the lithium secondary battery that has such an electrode group 4, shapes defined by IEC60086 or JIS C 8500 that is a standard for batteries defined by the International Electrotechnical Commission (IEC) can be employed. Examples thereof include shapes such as a cylindrical shape and a square shape.

Further, the lithium secondary battery is not limited to the aforementioned configuration of the winding type and may have a laminated configuration in which a laminated structure of the positive electrode, the separator, the negative electrode, and the separator is repeatedly overlaid. As the laminated lithium secondary battery, a so-called coin-type battery, a button-type battery, and a paper-type (or sheet-type) battery are exemplary examples.

Hereinafter, the respective configurations will be described in order.

(Positive Electrode)

The positive electrode according to the embodiment can be manufactured by preparing a positive electrode mixture including a positive electrode active material, a conductive material, and a binder first and causing a positive electrode current collector to carry the positive electrode mixture.

(Conductive Material)

As the conductive material that the positive electrode according to the embodiment has, a carbon material can be used. As the carbon material, graphite powder, carbon black (acetylene black, for example), and a fiber-shaped carbon material are exemplary examples. Since carbon black is fine powders and has a large surface area, it is possible to increase conductivity inside the positive electrode and to improve charging and discharging efficiency and output properties by adding a small amount of carbon black to the positive electrode mixture while both bonding force between the positive electrode mixture and the positive electrode current collector due to a binder and bonding force inside the positive electrode mixture are degraded and internal resistance rather increases if an excessive amount of carbon black is added.

The proportion of the conductive material in the positive electrode mixture is preferably equal to or greater than 1 parts by mass and equal to or less than 20 parts by mass with respect to 100 parts by mass of positive electrode active material. In a case in which a fiber-shaped carbon material such as graphitized carbon fiber or carbon nanotube is used as the conductive material, it is also possible to reduce the proportion.

(Binder)

As the binder that the positive electrode according to the embodiment has, a thermoplastic resin can be used. Examples of the thermoplastic resin include a fluorine resin such as polyvinylidene fluoride (hereinafter, also referred to as PVdF), polytetrafluoroethylene (hereinafter, also referred to as PTFE), a tetrafluoroethylene/hexafluoropropylene/vinylidene fluoride copolymer, a hexaflyoropropylene/vinylidene fluoride copolymer, and a tetrafluoroethylene/perfluorovinylether copolymer; and a polyolefin resin such as polyethylene and polypropylene.

Two ore more kinds of these thermoplastic resins may be mixed and used. It is possible to obtain a positive electrode mixture that provides both high adhesion force with the positive electrode current collector and high bonding force in the positive electrode mixture by using a fluorine resin and a polyolefin resin as binders, setting the proportion of the fluorine resin to be equal to or greater than 1% by mass and equal to or less than 10% by mass, and setting the proportion of the polyolefin resin to be equal to or greater than 0.1% by mass and equal to or less than 2% by mass with respect to the entire positive electrode mixture.

(Positive Electrode Current Collector)

As the positive electrode current collector that the positive electrode according to the embodiment has, a member with a belt shape that uses a metal material such as Al, Ni, or stainless steel as a formation material can be used. In particular, a member that uses Al as a formation material and that is worked into a thin film shape is preferably used in terms of easiness of working and low cost.

As a method of causing the positive electrode current collector to carry the positive electrode mixture, a method of compression-molding the positive electrode mixture on the positive electrode current collector is an exemplary example. Also, the positive electrode current collector may be caused to carry the positive electrode mixture by forming the positive electrode mixture as a paste using an organic solvent, applying the obtained paste of the positive electrode mixture to at least one surface side of the positive electrode current collector, causing the positive electrode mixture to be dried, and pressing and fixing the positive electrode mixture.

In a case in which the positive electrode mixture is formed into a paste, examples of the organic solvent that can be used include amine-based solvents such as N,N-dimethylaminopropylamine and diethylenetriamine; ether-based solvents such as tetrahydrofuran; ketone-based solvents such as methyl ethyl ketone; ester-based solvents such as methyl acetate; and amide-based solvents such as dimethylacetamide, N-methyl-2-pyrrolidone (hereinafter, also referred to as NMP).

As a method of coating the paste of the positive electrode mixture to the positive electrode current collector, a slit die application method, a screen application method, a curtain application method, a knife application method, a gravure application method, and an electrostatic spray method are exemplary examples.

It is possible to manufacture the positive electrode by the aforementioned method.

(Negative Electrode)

It is only necessary for the negative electrode that the lithium secondary battery according to the embodiment has to be able to dope and de-dope lithium ions with a lower potential than that of the positive electrode, and an electrode obtained by a negative electrode mixture including a negative electrode active substance being carried by a negative electrode current controller and an electrode consisting only of the negative electrode active substance is an exemplary example.

(Negative Electrode Active Substance)

As the negative electrode active substance that the negative electrode has, a carbon material, a chalcogen compound (such as an oxide, sulfide, or the like), a nitride, a metal, or an alloy, which are materials that can dope and de-dope lithium ions with a lower potential than that of the positive electrode, are exemplary examples.

Examples of the carbon materials that can be used as the negative electrode active substance includes graphite such as natural graphite and artificial graphite, cokes, carbon black, thermally decomposed carbons, carbon fiber, and organic polymer compound burned substance.

Examples of the oxide that can be used as the negative electrode active substance includes oxides of silicon represented by a formula $SiO_x$ (here, x is a positive actual number) such as $SiO_2$ and SiO; oxides of titanium represented by a formula $TiO_x$ (here, x is a positive actual number) such as $TiO_2$ and TiO; oxides of vanadium represented by a formula $VO_x$ (here, x is a positive actual number) such as $V_2O_5$ and $VO_2$; oxides of iron represented by a formula $FeO_x$ (here, x is a positive actual number) such as $Fe_3O_4$, $Fe_2O_3$, and FeO; oxides of tin represented by a formula $SnO_x$ (here, x is a positive actual number) such as $SnO_2$ and SnO; oxides of tungsten represented by a general formula $WO_x$ (here, x is a positive actual number) such as $WO_3$ and $WO_2$; and composite metal oxides that contain lithium, titanium, or vanadium such as $Li_4Ti_5O_{12}$ and $LiVO_2$.

Examples of the sulfide that can be used as the negative electrode active substance includes: sulfides of titanium represented by a formula $TiS_x$ (here, x is a positive actual number) such as $Ti_2S_3$, $TiS_2$ and TiS; sulfides of vanadium represented by a formula $VS_x$ (here, x is a positive actual number) such as $V_3S_4$, $VS_2$, and VS; sulfides of iron represented by a formula $FeS_x$, (here, x is a positive actual number) such as $Fe_3S_4$, $FeS_2$, and FeS; sulfides of molybdenum represented by a formula $MoS_x$ (here, x is a positive actual number) such as $Mo_2S_3$ and $MoS_2$; sulfides of tin represented by a formula $SnS_x$ (here, x is a positive actual number) such as $SnS_2$ and SnS; sulfides of tungsten represented by a formula $WS_x$ (here, x is a positive actual number) such as $WS_2$; sulfides of antimony represented by a formula $SbS_x$ (here, x is a positive actual number) such as $Sb_2S_3$; and sulfides of selenium represented by a formula $SeS_x$ (here, x is a positive actual number) such as $Se_5S_3$, $SeS_2$, and SeS.

Examples of the nitride that can be used as the negative electrode active substance include lithium-containing nitrides such as $Li_3N$ and $Li_{3-x}A_xN$ (here, A is any one of or both Ni and Co, and $0<x<3$ is satisfied).

One kind of these carbon materials, oxides, sulfides, and nitrides may be used alone, or two or more kinds thereof may be used in combination. Also, the carbon materials, oxides, sulfides, and nitrides may be either crystalline substances or amorphous substances.

Also, examples of the metal that can be used as the negative electrode active substance include lithium metal, silicon metal, and tin metal.

Examples that can be used as the negative electrode active substance also includes lithium alloys such as Li—Al, Li—Ni, Li—Si, Li—Sn, and Li—Sn—Ni; silicon alloys such as Si—Zn; tin alloys such as Sn—Mn, Sn—Co, Sn—Ni, Sn—Cu, and Sn—La; and alloys such as $Cu_2Sb$ and $La_3Ni_2Sn_7$.

These metals and alloys are worked into a foil form, for example, and are mainly used alone as an electrode.

Among the aforementioned negative electrode active substances, carbon materials that contains graphite as a main constituent, such as natural graphite and artificial graphite are preferably used for the reasons that there is substantially no change in the potential of the negative electrode from an uncharged state to a fully charged state at the time of charging (satisfactory potential flatness), an average discharging potential is low, a capacitance maintaining rate at the time of causing charging and discharging to repeatedly happen (satisfactory cycle properties). For example, the shape of the carbon material may be any of a thin piece shape such as natural graphite, a spherical shape such as a meso-carbon microbead, a fiber shape such as graphitized carbon fiber, an aggregates of fine powder, and the like.

The aforementioned negative electrode mixture may contain a binder as needed. Examples of the binder include a thermoplastic resin, and specific examples thereof include PVdF, thermoplastic polyimide, carboxymethyl cellulose, polyethylene, and polypropylene.

(Negative Electrode Current Collector)

Examples of the negative electrode current collector that the negative electrode has includes a long sheet-shaped member that uses, as a formation material, a metal material such as Cu, Ni, or stainless steel. In particular, a negative electrode current collector that uses Cu as a formation material and that is worked into a long sheet shape is preferably used in terms of difficult in creation of an alloy with lithium and easiness of working.

Examples of a method of causing such a negative electrode current collector to carry the negative electrode mixture includes a method using compression molding and a method of forming a paste using a solvent or the like, applying the paste to the negative electrode current controller, and drying, pressing, and pressure-bonding the negative electrode mixture.

(Separator)

As the separator that the lithium secondary battery according to the embodiment has, a material that is made of a material a polyolefin resin such as polyethylene or polypropylene, a fluorine resin, or a nitrogen-containing aromatic polymer and that has form of a porous film, a non-woven cloth, a woven cloth, or the like. Also, two or more kinds of these materials may be used to form the separator, or these materials may be laminated to form the separator.

In the embodiment, permeability resistance based on the Gurley method defined by JIS P 8117 is preferably equal to or greater than 50 seconds/100 $cm^3$ and equal to or less than 300 seconds/100 $cm^3$, and is more preferably equal to or greater than 50 seconds/100 $cm^3$ and equal to or less than 200 seconds/100 $cm^3$ in order for the separator to cause the electrolyte to satisfactorily permeate therethrough when the battery is used (at the time of charging and discharging).

Also, the porosity of the separator is preferably equal to or greater than 30% by volume and equal to or less than 80% by volume, and is more preferably equal to or greater than 40% by volume and equal to or less than 70% by volume. The separator may be obtained by laminating separators with different porosities.

(Electrolyte Solution)

The electrolyte solution that the lithium secondary battery according to the embodiment has contains an electrolyte and an organic solvent.

Examples of the electrolyte included in the electrolyte solution include lithium salts such as $LiClO_4$, $LiPF_6$, $LiAsF_6$, $LiSbF_6$, $LiBF_4$, $LiCF_3SO_3$, $LiN(SO_2CF_3)_2$, $LiN(SO_2C_2F_5)_2$, $LiN(SO_2CF_3)(COCF_3)$, $Li(C_4F_9SO_3)$, $LiC(SO_2CF_3)_3$, $Li_2B_{10}Cl_{10}$, LiBOB (Here, BOB represents bis(oxalato)borate), LiFSI (Here, FSI represents bis(fluorosulfonyl)imide), a lower aliphatic carboxylic acid lithium salt, and $LiAlCl_4$, and a mixture of two or more kinds thereof may be used. In particular, it is preferable to use an electrolyte that includes at least one kind selected from the group consisting of $LiPF_6$, $LiAsF_6$, $LiSbF_6$, $LiBF_4$, $LiCF_3SO_3$, $LiN(SO_2CF_3)_2$, and $LiC(SO_2CF_3)_3$ that includes fluorine.

Also, as the organic solvent included in the electrolyte solution, it is possible to use: carbonates such as propylene carbonate, ethylene carbonate, dimethyl carbonate, diethyl carbonate, ethyl methyl carbonate, 4-trifluoromethyl-1,3-dioxolane-2-one, and 1,2-di(methoxycarbonyloxy)ethane; ethers such as 1,2-dimethoxyethane, 1,3-dimethoxypropane, pentafluoropropyl methyl ether, 2,2,3,3-tetrafluoropropyl difluoromethy ether, tetrahydrofuran, and 2-methyltetrahydrofuran; esters such as methyl formate, methyl acetate, and γ-butyrolactone; nitriles such as acetonitrile and butyronitrile; amides such as N,N-dimethylformamide and N,N-dimethylacetamide; and carbamates such as 3-methyl-2-oxazolidone; sulfur-containing compounds such as sulfolane, dimethyl sulfoxide and 1,3-propanesultone, or substances obtained by further introducing a fluoro group into these organic solvents (substances obtained by replacing one or more hydrogen atoms that the organic solvent has are substituted with fluorine atoms).

As the organic solvent, two or more kinds thereof are preferably mixed and used. In particular, a mixture solvent including carbonates is preferably used, and a mixture solvent of a cyclic carbonate and a non-cyclic carbonate and a mixture solvent of a cyclic carbonate and ethers are further preferably used. As the mixture solvent of the cyclic carbonate and the non-cyclic carbonate, a mixture solvent that includes an ethylene carbonate, a dimethyl carbonate, and an ethyl methyl carbonate is preferably used. The electrolyte solution using such a mixture solvent have a lot of advantages that an operation temperature range is wide, degradation hardly occurs even if charging and discharging are performed at a high current rate, degradation hardly occurs even after utilization for a long period of time, and the electrolyte solution is persistent even in a case in which a graphite material such as natural graphite or artificial graphite is used as the negative electrode active material.

Also, as the electrolyte solution, it is preferable to use a lithium compound that includes fluorine such as $LiPF_6$ and an organic solvent that has a fluorine substituent group in order to obtain a safer lithium secondary battery. A mixture solvent that includes ethers that has a fluorine substituent group such as pentafluoropropyl methyl ether or 2,3,3,3-tetrafluoropropyl difluoromethyl ether and dimethyl carbonate is further preferably used due to a high capacitance maintaining rate even at the time of charging and discharging at a high current rate.

A solid electrolyte may be used instead of the aforementioned electrolyte solution. As the solid electrolyte, it is possible to use an organic polymer electrolyte such as a polyethylene oxide-based polymer compound and a polymer compound that includes at least one or more of a polyorganosiloxane chain and a polyoxyalkylene chain. In addition, it is possible to use a so-called gel obtained by causing a polymer compound to hold a nonaqueous electrolyte solution. Also, inorganic solid electrolytes including sulfides such as $Li_2S$—$SiS_2$, $Li_2S$—$GeS_2$, $Li_2S$—$P_2S_5$, $Li_2S$—$B_2S_3$, $Li_2S$—$SiS_2$—$Li_3PO_4$, $Li_2S$—$SiS_2$—$Li_2SO_4$, and $Li_2S$—$GeS_2$—$P_2S_5$ are exemplary examples, and a mixture of two or more kinds thereof may be used. By using these solid electrolytes, it is possible to further enhance safety of the lithium secondary battery.

Also, in a case in which the solid electrolyte is used in the lithium secondary battery according to the embodiment, the solid electrolyte may serve as a separator, and in such a case, there may be no need to provide a separator.

Since the positive electrode active material with the configuration as described above uses the aforementioned lithium-containing composite metal oxide according to the embodiment, it is possible to extend a lifetime of the lithium secondary battery using the positive electrode active material.

Also, since the positive electrode with the configuration as described above has the aforementioned positive electrode active material for a lithium secondary battery according to the embodiment, it is possible to extend the lifetime of the lithium secondary battery.

Further, since the lithium secondary battery with the configuration as described above has the aforementioned positive electrode, a lithium secondary battery with a longer lifetime than that in the related art is achieved.

EXAMPLES

Next, aspects of the invention will be described in further detail with reference to examples.

In the examples, evaluation of the positive electrode active material precursor for a lithium secondary battery and creation evaluation of the positive electrode for a lithium secondary battery and the lithium secondary battery were conducted as follows.

<Half Width α of Peak that is Present within Range of Diffraction Angle 2θ=19.2±1° and Half Width β of Peak that is Present within Range of 2θ=44.5±1°>

Powder X-ray diffraction measurement of a lithium-containing composite metal oxide was conducted using an X-ray diffraction device (X-Prt PRO, PANalytical).

A dedicated substrate was filled with the positive electrode active material precursor for a lithium secondary battery, and measurement was performed using a CuKα beam source within a range of the diffraction angle 2θ=10° to 90°, thereby obtaining a powder X-ray diffraction figure. A half width of a peak corresponding to a peak A was obtained from the powder X-ray diffraction figure using powder X-ray diffraction pattern overall analysis software JADES, and the half width c of the peak that was present within the range of the diffraction angle $2\theta=19.2\pm1°$ and the half width β of the peak that was present within the range of $2\theta=38.5\pm1°$ were calculated by the Scherrer formula.

<Observation of Precursor>

Precursor particles to be measured were placed on a conductive sheet attached to a sample stage, irradiation with an electron beam with an acceleration voltage of 20 kV was performed using JSM-5510 manufactured by JEOL Ltd., and SEM observation was conducted. The surface of the precursor was observed from an image obtained through the SEM observation (SEM photo).

<Measurement of Tap Bulk Density of Positive Electrode Active Material Precursor for Lithium Secondary Battery>

Tap bulk density was measured on the basis of JIS R 1628-1997.

<Measurement of Secondary Particle Diameter of Positive Electrode Active Material Precursor for Lithium Secondary Battery>

For measurement of the secondary particle diameter, a laser diffraction particle size distributer (manufactured by Horiba Ltd., LA-950) was used. 0.1 g of positive electrode active material precursor powder for a lithium secondary battery was poured into 50 ml of an aqueous solution of 0.2% by mass of sodium hexametaphosphate, thereby obtaining a dispersion with the powder dispersed therein. The particle size distribution of the obtained dispersion was measured, and a volume-based cumulative particle size distribution curve was obtained. In the obtained cumulative particle size distribution curve, a value of a particle diameter (D50) when seen from the side of the fine particles at the time of 50% accumulation was regarded as a secondary particle diameter of the positive electrode active material precursor for a lithium secondary battery.

<BET Specific Surface Area of Positive Electrode Active Material Precursor for Lithium Secondary Battery>

After 1 g of positive electrode active material precursor powder for a lithium secondary battery was dried at 105° C. for 30 minutes in a nitrogen atmosphere, measurement was performed using Macsorb (registered trademark) manufactured by Mountec Co., Ltd.

<Composition Analysis>

Composition analysis of the positive electrode active material precursor for a lithium secondary battery and the positive electrode active material powder for a lithium secondary battery, which were manufactured by the method described later, were conducted using an inductively coupled plasma emission spectrometer (manufactured by Sii Nanotechnology Inc., SPS3000) after the obtained powder was dissolved in a hydrochloric acid.

<Creation of Positive Electrode for Lithium Secondary Battery>

The positive electrode active material for a lithium secondary battery obtained by the manufacturing method, which will be described later, a conductive material (acetylene black), and a binder (PVdF) were added and kneaded such that the composition of the positive electrode active material for a lithium secondary battery: the conductive material: the binder=92:5:3 (mass ratio) is satisfied, thereby creating a positive electrode mixture in a paste form. For preparing the positive electrode mixture, N-methyl-2-pyrrolidone was used as an organic solvent.

The obtained positive electrode mixture was applied to an aluminum foil with the thickness of 40 μm that serves as a current collector and was vacuum-dried at 150° C. for 8 hours, obtaining a positive electrode for a lithium secondary battery. An electrode area of the positive electrode for a lithium secondary battery was set to 1.65 cm².

<Creation of Lithium Secondary Battery (Coin-Type Half-Cell)>

The following operations were conducted in a glove box in an argon atmosphere.

The positive electrode for a lithium secondary battery created in <Creation of positive electrode for lithium secondary battery> was placed on a lower lid of a part for a coin-type battery R2032 (manufactured by Hohsen Corporation) such that the aluminum foil was oriented downward, and a laminated film separator was placed thereon (a heat-resistant porous layer was laminated (thickness: 16 μm) on a porous film made of polyethylene). 300 μl of electrolyte solution was poured thereto. As the electrolyte solution, a substance obtained by dissolving $LiPF_6$ in a 30:35:35 (volume ratio) mixture solution of ethylene carbonate (hereinafter, also referred to as EC), dimethyl carbonate (hereinafter, also referred to as DMC), and ethylene methyl carbonate (hereinafter, also referred to as EMC) such that the amount of 1.0 mol/l is satisfied (hereinafter, also represented as $LiPF_6$/EC+DMC+EMC) was used.

Next, the negative electrode is placed on the upper side of the laminated film separator using metal lithium as the negative electrode, and an upper lid was closed via a gasket and was caulked with a caulking machine, thereby creating a lithium secondary battery (coin-type half-cell R2032; hereinafter, also referred to as a "half-cell").

<Discharging Test>

The half-cell created in <Creation of lithium secondary battery (coin-type half-cell)> was used to conduct an initial charging and discharging test under conditions described below.

<Charging and Discharging Test Conditions>

Test temperature: 25° C.

Charging maximum voltage: 4.45 V, charging time: 6 hours, charging current: 0.2 CA, constant current and constant voltage charging Discharging minimum voltage: 2.50 V, discharging time: 5 hours, discharging current: 0.2 CA, constant current discharging Example 1

1. Manufacturing of Positive Electrode Active Material 1 for Lithium Secondary Battery After water was poured into a reaction tank provided with a stirrer and an overflow pipe, an aqueous solution of sodium hydroxide was added thereto, and the liquid temperature was maintained at 60° C.

An aqueous solution of nickel sulfate, an aqueous solution of cobalt sulfate, and an aqueous solution of manganese sulfate were mixed such that an atomic ratio of nickel atoms, cobalt atoms, and manganese atoms satisfied 87.5:9.5:2.0, thereby preparing a mixture starting solution.

Next, the mixture starting solution, 10.8% by mass of aqueous solution of aluminum sulfate, and an aqueous solution of ammonium sulfate were successively added as a complexing agent to the reaction tank while being stirred. The flow rate of the aqueous solution of aluminum sulfate was adjusted such that an atomic ratio of the nickel atoms, cobalt atoms, manganese atoms, and aluminum atoms satisfied 87.5:9.5:2.0:1.0. Also, oxygen-containing gas obtained by mixing nitrogen gas into air such that the oxygen concentration became 5.0% was caused to be successively ventilated.

An aqueous solution of sodium hydroxide was timely dropped such that p H of the solution in the reaction tank became 12.2 at the time of measurement at 40° C., nickel, cobalt, manganese composite hydroxide particles were obtained, were washed with a sodium hydroxide solution, were dehydrated and were isolated with a centrifugal separator, and were dried at 105° C., thereby obtaining nickel, cobalt, manganese composite hydroxide 1. The half width α of the peak that was present within the range of the diffraction angle 2θ=19.2±1° of obtained nickel, cobalt, manganese composite hydroxide 1 was 0.60, and the half width β of the peak that was present within the range of 2θ=38.5±1° was 0.48. "α/β" calculated on the basis of them was 1.25.

When the composition of the obtained nickel, cobalt, manganese composite hydroxide 1 was analyzed and caused to correspond to the composition formula (I), x=0.875, y=0.095, z=0.02, and w=0.01 were obtained.

The nickel, cobalt, manganese, aluminum composite hydroxide 1 obtained as described above was burned at 650° C. for 5 hours in an ambient air atmosphere, thereby obtaining a nickel, cobalt, manganese, aluminum composite oxide 1.

The nickel, cobalt, manganese, aluminum composite oxide 1 obtained as described above and lithium hydroxide powder were weighed and mixed such that a molar ration of Li/(Ni+Co+Mn+Al)=1.00 was achieved, were burned at 760° C. for 5 hours in an oxygen atmosphere, and was further burned at 760° C. for 5 hours in an oxygen atmosphere, thereby obtaining a target positive electrode active material 1 for a lithium secondary battery.

2. Evaluation of Positive Electrode Active Material for Lithium Secondary Battery Since the composition of the obtained positive electrode active material 1 for a lithium secondary battery was analyzed and caused to correspond to the composition formula (II), a=−0.01, x=0.876, y=0.094, z=0.018, and w=0.012 were obtained.

Example 2

1. Manufacturing of Positive Electrode Active Material 2 for Lithium Secondary Battery After water was poured into a reaction tank provided with a stirrer and an overflow pipe, an aqueous solution of sodium hydroxide was added, and the liquid temperature was maintained at 60° C.

An aqueous solution of nickel sulfate, an aqueous solution of cobalt sulfate, and an aqueous solution of manganese sulfate were mixed such that an atomic ratio of nickel atoms, cobalt atoms, and manganese atoms became 90:7:2, thereby preparing a mixture starting solution.

Next, the mixture starting solution, 10.8% by mass of aqueous solution of aluminum sulfate, and an aqueous solution of ammonium sulfate were successively added as a complexing agent to the reaction tank while being stirred. The flow rate of the aqueous solution of aluminum sulfate was adjusted such that an atomic ratio of nickel atoms, cobalt atoms, manganese atoms, and aluminum atoms became 90:7:2:1. Also, oxygen-containing gas obtained by mixing air into nitrogen gas such that oxygen concentration became 12.0% was caused to be successively ventilated.

An aqueous solution of sodium hydroxide was timely dropped such that pH of the solution in the reaction tank became 11.4 at the time of measurement at 40° C., nickel, cobalt, manganese composite hydroxide particles were obtained, were washed with a sodium hydroxide solution, were dehydrated and were isolated with a centrifugal separator, and were dried at 105° C., thereby obtaining nickel, cobalt, manganese composite hydroxide 2. The half width α of the peak that was present within the range of the diffraction angle 2θ=19.2±1° of the obtained nickel, cobalt, manganese composite hydroxide 2 was 0.95, and the half width β of the peak that was present within the range of 2θ=38.5±1° was 0.82. "α/β" calculated on the basis of them was 1.16.

When the composition of the obtained nickel, cobalt, manganese composite hydroxide 2 was analyzed and was caused to correspond to the composition formula (I), x=0.90, y=0.07, z=0.02, and w=0.01 were obtained.

The nickel, cobalt, manganese composite hydroxide 2 obtained as described above and lithium hydroxide powder were weighed and mixed such that the molar ratio of Li/(Ni+Co+Mn+Al)=1.10 was satisfied, were then burned at 600° C. for 3 hours in an oxygen atmosphere, and were further burned at 750° C. for 3 hours in an oxygen atmosphere, thereby obtaining a target positive electrode active material 2 for a lithium secondary battery.

2. Evaluation of Positive Electrode Active Material 2 for Lithium Secondary Battery When the composition of the obtained positive electrode active material 2 for lithium secondary battery was analyzed and was caused to correspond to the composition formula (II), a=0.046, x=0.897, y=0.070, z=0.022, and w=0.011 were obtained.

Example 3

1. Manufacturing of Positive Electrode Active Material 3 for Lithium Secondary Battery After water was poured into a reaction tank provided with a stirrer and an overflow pipe, an aqueous solution of sodium hydroxide was added, and the liquid temperature was maintained at 75° C.

An aqueous solution of nickel sulfate, an aqueous solution of cobalt sulfate, and an aqueous solution of manganese sulfate were mixed such that an atomic ratio of nickel atoms, cobalt atoms, and manganese atoms became 90:7:2, thereby preparing a mixture starting solution.

Next, the mixture starting solution, 10.8% by mass of aqueous solution of aluminum sulfate, and an aqueous solution of ammonium sulfate were successively added as a complexing agent to the reaction tank while being stirred. The flow rate of the aqueous solution of aluminum sulfate was adjusted such that an atomic ratio of nickel atoms, cobalt atoms, manganese atoms, and aluminum atoms became 90:7:2:1. Also, nitrogen gas was caused to be successively ventilated.

An aqueous solution of sodium hydroxide was timely dropped such that pH of the solution in the reaction tank became 11.1 at the time of measurement at 40° C., nickel, cobalt, manganese composite hydroxide particles were obtained, were washed with a sodium hydroxide solution, were dehydrated and isolated with a centrifugal separator, and were dried at 105° C., thereby obtaining nickel, cobalt, manganese composite hydroxide 3. The half width α of the peak that was present within the range of the diffraction angle 2θ=19.2±1° of the obtained nickel, cobalt, manganese composite hydroxide 3 was 0.83, and the half width β of the peak that was present within the range of 2θ=38.5±1° was 0.76. "α/β" calculated on the basis of them was 1.10.

When the composition of the obtained nickel, cobalt, manganese composite hydroxide 3 was analyzed and was caused to correspond to the composition formula (I), x=0.90, y=0.07, z=0.02, and w=0.01 were obtained.

The nickel, cobalt, manganese composite hydroxide 3 obtained as described above and lithium carbonate powder were weighed and mixed such that the molar ratio of Li(Ni+Co+Mn+Al)=1.02 was satisfied, were burned at 750° C. for 5 hours in an oxygen atmosphere, and were further burned at 680° C. for 5 hours, thereby obtaining a target positive electrode active material 3 for a lithium secondary battery.

2. Evaluation of Positive Electrode Active Material 3 for Lithium Secondary Battery When the composition of the obtained positive electrode active material 3 for a lithium secondary battery was analyzed and caused to correspond to the composition formula (II), a=0.008, x=0.90, y=0.07, z=0.02, and w=0.01 were obtained.

Example 4

1. Manufacturing of Positive Electrode Active Material 4 for Lithium Secondary Battery After water was poured into a reaction tank provided with a stirrer and an overflow pipe, an aqueous solution of sodium hydroxide was added thereto, and the liquid temperature was maintained at 45° C.

An aqueous solution of nickel sulfate, an aqueous solution of cobalt sulfate, and an aqueous solution of manganese sulfate were mixed such that an atomic ratio of nickel atoms, cobalt atoms, and manganese atoms became 70:20:10, thereby preparing a mixture starting solution.

Next, the mixture starting solution and an aqueous solution of ammonium sulfate were successively added as a complexing agent to the reaction tank while being stirred, and nitrogen gas was caused to be successively ventilated. An aqueous solution of sodium hydroxide was timely dropped such that pH of the solution in the reaction tank became 10.5 at the time of measurement at 40° C., and nickel, cobalt, manganese composite hydroxide particles were obtained, were washed with a sodium hydroxide solution, were dehydrated and isolated with a centrifugal separator, and were dried at 105° C., thereby obtaining nickel, cobalt, manganese composite hydroxide 4. The half width α of the peak that was present within the range of the diffraction angle 2θ=19.2±1° of the obtained nickel, cobalt, manganese composite hydroxide 4 was 0.51, and the half width β of the peak that was present within the range of 2θ=38.5±1° was 0.56. "α/β" obtained on the basis of them was 0.91.

When the composition of the obtained nickel, cobalt, manganese composite hydroxide 4 was analyzed and caused to correspond to the composition formula (I), x=0.70, y=0.20, z=0.10, and w=0 were obtained.

The nickel, cobalt, manganese composite hydroxide 4 obtained as described above and lithium hydroxide powder were weighed and mixed such that the molar ratio of Li(Ni+Co+Mn)=1.03 was satisfied, were then burned at 700° C. for 5 hours in an oxygen atmosphere, and were further burned at 850° C. for 10 hours, thereby obtaining a target positive electrode active material 4 for a lithium secondary battery.

2. Evaluation of Positive Electrode Active Material 4 for Lithium Secondary Battery When the composition of the obtained positive electrode active material 4 for a lithium secondary battery was analyzed and caused to correspond to the composition formula (I), a=0.015, x=0.70, y=0.20, z=0.10, and w=0 were obtained.

Example 5

1. Manufacturing of Positive Electrode Active Material 5 for Lithium Secondary Battery After water was poured into a reaction tank provided with a stirrer and an overflow pipe, an aqueous solution of sodium hydroxide was added thereto, and the liquid temperature was maintained at 60° C.

An aqueous solution of nickel sulfate, an aqueous solution of cobalt sulfate, and an aqueous solution of manganese sulfate were mixed such that an atomic ratio of nickel atoms, cobalt atoms, and manganese atoms became 90:7:2, thereby preparing a mixture starting solution.

Next, the mixture starting solution, 10.8% by mass of aqueous solution of aluminum sulfate, and an aqueous solution of ammonium sulfate were successively added as a complexing agent to the reaction tank while being stirred. The flow amount of the aqueous solution of aluminum sulfate was adjusted such that an atomic ratio of nickel atoms, cobalt atoms, manganese atoms, and aluminum atoms became 90:7:2:1. Also, oxygen-containing gas obtained by mixing air in nitrogen gas such that oxygen concentration became 5.0% was caused to be successively ventilated.

An aqueous solution of sodium hydroxide was timely dropped such that pH of the solution in the reaction tank became 12.3 at the time of measurement at 40° C., and nickel, cobalt, manganese composite hydroxide particles were obtained, were washed with a sodium hydroxide solution, were dehydrated and isolated with a centrifugal separator, and were dried at 105° C., thereby obtaining nickel, cobalt, manganese composite hydroxide 5. The half width α of the peak that was present within the range of the diffraction angle 2θ=19.2±1° of the obtained nickel, cobalt, manganese composite hydroxide 5 was 0.49, and the half width β of the peak that was present within the range of 2θ=38.5±1° was 0.42. "α/β" calculated on the basis of them was 1.15.

When the composition of the obtained nickel, cobalt, manganese composite hydroxide 5 was analyzed and caused to correspond to the composition formula (I), x=0.90, y=0.07, z=0.02, and w=0.01 were obtained.

The nickel, cobalt, manganese aluminum composite hydroxide 5 obtained as described above was burned at 650° C. for 5 hours in an air atmosphere, thereby obtaining a nickel, cobalt, manganese, aluminum composite oxide 5.

The nickel, cobalt, manganese, aluminum composite oxide 5 obtained as described above and lithium hydroxide powder were weighed and mixed such that the molar ratio of Li(Ni+Co+Mn+Al)=1.00 was satisfied, were then burned at 760° C. for 5 hours in an oxygen atmosphere, and further burned at 760° C. for 5 hours in an oxygen atmosphere, thereby obtaining a target positive electrode active material 5 for a lithium secondary battery.

2. Evaluation of Positive Electrode Active Material 5 for Lithium Secondary Battery When the composition of the obtained positive electrode active material 5 for lithium secondary battery was analyzed and caused to correspond to the composition formula (II), a=−0.004, x=0.88, y=0.09, z=0.02, and w=0.01 were obtained.

Example 6

1. Manufacturing of Positive Electrode Active Material 6 for Lithium Secondary Battery After water was poured into a reaction tank provided with a stirrer and an overflow pipe, an aqueous solution of sodium hydroxide was added thereto, and the liquid temperature was maintained at 60° C.

An aqueous solution of nickel sulfate and an aqueous solution of cobalt sulfate were mixed such that an atomic ratio of nickel atoms and cobalt atoms became 85:13, thereby preparing a mixture starting solution.

Next, the mixture starting solution, 10.8% by mass of aqueous solution of aluminum sulfate, and an aqueous solution of ammonium sulfate were successively added as a complexing agent to the reaction tank while being stirred. The flow rate of the aqueous solution of aluminum sulfate was adjusted such that an atomic ratio of nickel atoms, cobalt atoms, and aluminum atoms became 85:13:2. Also, oxygen-containing gas obtained by mixing air into nitrogen gas such that oxygen concentration became 8.3% was caused to be successively ventilated.

An aqueous solution of sodium hydroxide was timely dropped such that pH of the solution in the reaction tank became 11.2 at the time of measurement at 40° C., and nickel, cobalt, aluminum composite hydroxide particles were obtained, were washed with a sodium hydroxide solution, were dehydrated and isolated with a centrifugal separator, and were dried at 105° C., thereby obtaining nickel, cobalt, aluminum composite hydroxide 1. The half width α of the peak that was present within the range of the diffraction angle 2θ=19.2±1 of the obtained nickel, cobalt, aluminum composite hydroxide 1 was 0.62, and the half width β of the peak that was present within the range of 2θ=38.5±1° was 0.48. "α/β" calculated on the basis of them was 1.29.

When the composition of the obtained nickel, cobalt, aluminum composite hydroxide 1 was analyzed and was caused to correspond to the composition formula (I), x=0.85, y=0.13, z=0, and w=0.02 were obtained.

The nickel, cobalt, aluminum composite hydroxide 1 obtained as described above was burned at 650° C. for 5 hours in an air atmosphere, thereby obtaining a nickel, cobalt, aluminum composite oxide 1.

The nickel, cobalt, aluminum composite oxide 1 obtained as described above and lithium hydroxide powder were weighed and mixed such that the molar ratio of Li/(Ni+Co+Al)=1.01 was satisfied, were burned at 760° C. for 5 hours in an oxygen atmosphere, and were further burned at 720° C. for 10 hours in an oxygen atmosphere, thereby obtaining a target positive electrode active material 6 for a lithium secondary battery.

2. Evaluation of Positive Electrode Active Material 6 for Lithium Secondary Battery When the composition of the obtained positive electrode active material 6 for a lithium secondary battery was analyzed and caused to correspond to the composition formula (II), a=0.014, x=0.855, y=0.128, z=0, and w=0.017 were obtained.

Comparative Example 1

1, Manufacturing of Positive Electrode Active Material 7 for Lithium Secondary Battery After water was poured into a reaction tank provided with a stirrer and an overflow pipe, an aqueous solution of sodium hydroxide was added thereto, and the liquid temperature was maintained at 55° C.

An aqueous solution of nickel sulfate, an aqueous solution of cobalt sulfate, and an aqueous solution of manganese sulfate were mixed such that an atomic ratio of nickel atoms, cobalt atoms, and manganese atoms became 90:7:2, thereby preparing a mixture starting solution.

Next, the mixture starting solution, 10.8% by mass of aqueous solution of aluminum sulfate, and an aqueous solution of ammonium sulfate were successively added as a complexing agent to the reaction tank while being stirred. The flow rate of the aqueous solution of aluminum sulfate was adjusted such that an atomic ratio of nickel atoms, cobalt atoms, manganese atoms, and aluminum atoms became 90:7:2:1. Also, nitrogen gas was caused to be successively ventilated.

An aqueous solution of sodium hydroxide was timely dropped such that pH of the solution in the reaction tank became 11.7 at the time of measurement at 40° C., and nickel, cobalt, manganese composite hydroxide particles were obtained, were washed with a sodium hydroxide solution, were dehydrated and isolated with a centrifugal separator, and were dried at 105° C., thereby obtaining a nickel, cobalt, manganese composite hydroxide 7. The half width α of the peak that was present within the range of the diffraction angle 2θ=19.2±1° of the obtained nickel, cobalt, manganese composite hydroxide 7 was 0.84, and the half width β of the peak that was present within the range of 2θ=38.5±1° was 1.08. "α/β" calculated on the basis of them was 0.78.

When the composition of the obtained nickel, cobalt, manganese composite hydroxide 7 was analyzed and caused to correspond to the composition formula (I), x=0.90, y=0.07, z=0.02, and w=0.01 were obtained.

The nickel, cobalt, manganese composite hydroxide 7 obtained as described above and lithium hydroxide powder were weighed and mixed such that the molar ratio of Li(Ni+Co+Mn+Al)=1.00 was satisfied, were burned at 600° C. for 5 hours in an oxygen atmosphere, and were further burned at 750° C. for 10 hours, thereby obtaining a target positive electrode active material 7 for a lithium secondary battery.

2. Evaluation of Positive Electrode Active Material 7 for Lithium Secondary Battery When the composition of the obtained positive electrode active material 7 for a lithium secondary battery was analyzed and caused to correspond to the composition formula (II), a=0.002, x=0.90, y=0.07, z=0.02, and w=0.01 were obtained.

Comparative Example 2

1. Manufacturing of Positive Electrode Active Material 8 for Lithium Secondary Battery After water was poured into a reaction tank provided with a stirrer and an overflow pipe, an aqueous solution of sodium hydroxide was added thereto, and the liquid temperature was maintained at 45° C.

An aqueous solution of nickel sulfate, an aqueous solution of cobalt sulfate, and an aqueous solution of manganese sulfate were mixed such that an atomic ratio of nickel atoms, cobalt atoms, and manganese atoms became 85.5:9.5:2, thereby preparing a mixture starting solution.

Next, the mixture starting solution, 10.8% by mass of aqueous solution of aluminum sulfate, and an aqueous solution of ammonium sulfate were successively added as a complexing agent to the reaction tank while being stirred. The flow rate of the aqueous solution of aluminum sulfate was adjusted such that an atomic ratio of nickel atoms, cobalt atoms, manganese atoms, and aluminum atoms became 85.5:9.5:2:3. Also, nitrogen gas was caused to be successively ventilated.

An aqueous solution of sodium hydroxide was timely dropped such that pH of the solution in the reaction tank became 11.9 at the time of measurement at 40° C., and nickel, cobalt, manganese composite hydroxide particles were obtained, were washed with a sodium hydroxide solution, were dehydrated and isolated with a centrifugal separator, and were dried at 105° C., thereby obtaining a nickel, cobalt, manganese composite hydroxide 8. The half width α of the peak that was present within the range of the diffraction angle 2θ=19.2±1° of the obtained nickel, cobalt, manganese composite hydroxide 8 was 1.02, and the half width β of the peak that was present within the range of 2θ=38.5±1° was 1.22. "α/β" calculated on the basis of them was 0.84.

When the composition of the obtained nickel, cobalt, manganese composite hydroxide 8 was analyzed and caused to correspond to the composition formula (I), x=0.855, y=0.095, z=0.02, and w=0.03 were obtained.

The nickel, cobalt, manganese composite hydroxide 8 obtained described above and lithium hydroxide powder were weighed and mixed at a molar ratio of Li/(Ni+Co+Mn+Al)=1.00, were then burned at 750° C. for 5 hours in an oxygen atmosphere, and were burned at 770° C. for 10 hours, thereby obtaining a target positive electrode active material 8 for a lithium secondary battery.

2. Evaluation of Positive Electrode Active Material 8 for Lithium Secondary Battery When the composition of the obtained positive electrode active material 8 for a lithium secondary battery was analyzed and caused to correspond to the composition formula (II), a=0.002, x=0.857, y=0.094, z=0.02, and w=0.03 were obtained.

Comparative Example 3

1. Manufacturing of Positive Electrode Active Material 9 for Lithium Secondary Battery After water was poured into a reaction tank provided with a stirrer and an overflow pipe, an aqueous solution of sodium hydroxide was added thereto, and the liquid temperature was maintained at 55° C.

An aqueous solution of nickel sulfate, an aqueous solution of cobalt sulfate, and an aqueous solution of manganese sulfate were mixed such that an atomic ratio of nickel atoms, cobalt atoms, and manganese atoms became 85.5:12.5:2, thereby preparing a mixture starting solution.

Next, the mixture starting solution and an aqueous solution of ammonium sulfate were successively added as a complexing agent to the reaction tank while being stirred, and nitrogen gas was caused to be successively ventilated. An aqueous solution of sodium hydroxide was timely dropped such that pH of the solution in the reaction tank became 13.1 at the time of measurement at 40° C., and nickel, cobalt, manganese composite hydroxide particles were obtained, were washed with a sodium hydroxide solution, were dehydrated and isolated with a centrifugal separator, and were dried at 105° C., thereby obtaining a nickel, cobalt, manganese composite hydroxide 9. The half width α of the peak that was present within the range of the diffraction angle 2θ=19.2±1° of the obtained nickel, cobalt, manganese composite hydroxide 9 was 0.56, and the half width β of the peak that was present within the range of 2θ=38.5±1° was 0.76. "α/β" calculated on the basis of them was 0.74.

When the composition of the obtained nickel, cobalt, manganese composite hydroxide 9 was analyzed and caused to correspond to the composition formula (I), x=0.855, y=0.125, z=0.02, and w=0 were obtained.

The nickel, cobalt, manganese composite hydroxide 9 obtained as described above and lithium hydroxide powder were weighed and mixed such that the molar ratio of Li(Ni+Co+Mn)=1.00 was satisfied, were then burned at 600° C. for 5 hours in an oxygen atmosphere, and were further burned at 750° C. for 10 hours, thereby obtaining a target positive electrode active material 9 for a lithium secondary battery.

2. Evaluation of Positive Electrode Active Material 9 for Lithium Secondary Battery When the composition of the obtained positive electrode active material 9 for a lithium secondary battery was analyzed and caused to correspond to the composition formula (II), a=0.001, x=0.855, y=0.124, z=0.021, and w=0 were obtained.

Comparative Example 4

1. Manufacturing of Positive Electrode Active Material 10 for Lithium Secondary Battery After water was poured into a reaction tank provided with a stirrer and an overflow pipe, an aqueous solution of sodium hydroxide was added thereto, and the liquid temperature was maintained at 60° C.

An aqueous solution of nickel sulfate, an aqueous solution of cobalt sulfate, and an aqueous solution of manganese sulfate were mixed such that an atomic ratio of nickel atoms, cobalt atoms, and manganese atoms became 90:7:2, thereby preparing a mixture starting solution.

Next, the mixture starting solution, 10.8% by mass of aqueous solution of aluminum sulfate, and an aqueous solution of ammonium sulfate were successively added as a complexing agent to the reaction tank while being stirred. The flow rate of the aqueous solution of aluminum sulfate was adjusted such that an atomic ratio of nickel atoms, cobalt atoms, manganese atoms, and aluminum atoms became 90:7:2:1. Also, nitrogen gas was caused to be successively ventilated.

An aqueous solution of sodium hydroxide was timely dropped such that pH of the solution in the reaction tank became 11.4 at the time of measurement at 40° C., and nickel, cobalt, manganese composite hydroxide particles were obtained, were washed with a sodium hydroxide solution, were dehydrated and isolated with a centrifugal separator, and were dried at 105° C., thereby obtaining a nickel, cobalt, manganese composite hydroxide 10. The half width α of the peak that was present within the range of the diffraction angle 2θ=19.2±1° of the obtained nickel, cobalt, manganese composite hydroxide 10 was 0.90, and the half width β of the peak that was present within the range of 2θ=38.5±1° was 1.02. "α/β" calculated on the basis of them was 0.88.

When the composition of the obtained nickel, cobalt, manganese composite hydroxide 10 was analyzed and caused to correspond to the composition formula (I), x=0.90, y=0.07, z=0.02, and w=0.01 were obtained.

The nickel, cobalt, manganese composite hydroxide 10 obtained as described above and lithium carbonate powder were weighed and mixed at a molar ratio satisfying Li/(Ni+Co+Mn+Al)=1.02, were then burned at 600° C. for 5 hours in an oxygen atmosphere, and were further burned at 750° C. for 10 hours, thereby obtaining a target positive electrode active material 10 for a lithium secondary battery.

2. Evaluation of Positive Electrode Active Material 10 for Lithium Secondary Battery When the composition of the obtained positive electrode active material 10 for a lithium secondary battery was analyzed and caused to correspond to the composition formula (II), a=0.01, x=0.900, y=0.069, z=0.020, and w=0.010 were obtained.

Comparative Example 5

1. Manufacturing of Positive Electrode Active Material 11 for Lithium Secondary Battery After water was poured into a reaction tank provided with a stirrer and an overflow pipe, an aqueous solution of sodium hydroxide was added thereto, and the liquid temperature was maintained at 55° C.

An aqueous solution of nickel sulfate, an aqueous solution of cobalt sulfate, and an aqueous solution of manganese sulfate were mixed such that an atomic ratio of nickel atoms, cobalt atoms, and manganese atoms became 70:20:10, thereby preparing a mixture starting solution.

Next, the mixture starting solution and an aqueous solution of ammonium sulfate were successively added as a complexing agent to the reaction tank while being stirred, and nitrogen gas was caused to be successively ventilated. An aqueous solution of sodium hydroxide was timely dropped such that pH of the solution in the reaction tank became 11.9 at the time of measurement at 40° C., and nickel, cobalt, manganese composite hydroxide particles were obtained, were washed with a sodium hydroxide solution, were dehydrated and isolated with a centrifugal separator, and were dried at 105° C., thereby obtaining a nickel, cobalt, manganese composite hydroxide 11. The half width α of the peak that was present within the range of the diffraction angle 2θ=19.2±1° of the obtained nickel, cobalt, manganese composite hydroxide 11 was 0.65, and the half width β of the peak that was present within the range of 2θ=38.5±1° was 0.81. "α/β" calculated on the basis of them was 0.80.

When the composition of the obtained nickel, cobalt, manganese composite hydroxide 11 was analyzed and caused to correspond to the composition formula (I), x=0.70, y=0.20, z=0.10, and w=0 were obtained.

The nickel, cobalt, manganese composite hydroxide 11 obtained as described above and lithium hydroxide powder were weighed and mixed such that the molar ratio of Li/(Ni+Co+Mn)=1.03 was satisfied, were burned at 700° C. for 5 hours in an oxygen atmosphere, and were further burned at 850° C. for 10 hours, thereby obtaining a target positive electrode active material 11 for a lithium secondary battery.

2. Evaluation of Positive Electrode Active Material 11 for Lithium Secondary Battery When the composition of the obtained positive electrode active material 11 for a lithium secondary battery was analyzed and caused to correspond to the composition formula (II), a=0.01, x=0.696, y=0.201, z=0.103, and w=0 were obtained.

In Table 1 shown below, precursor half widths α, precursor half widths β, α/β, initial charging and discharging efficiency, secondary particle diameters (D50), tap bulk densities, and BET specific surface areas in Examples 1 to 6 and Comparative Examples 1 to 5 will be shown.

TABLE 1

|  | Precursor half width α | Precursor half width β | α/β | Initial charging and discharging efficiency (%) | Particle diameter D50 (μm) | TAP density (g/cc) | BET ($m^2/g$) |
|---|---|---|---|---|---|---|---|
| Example 1 | 0.60 | 0.48 | 1.25 | 91.4 | 10.5 | 1.63 | 29.6 |
| Example 2 | 0.95 | 0.82 | 1.16 | 89.2 | 10.6 | 1.63 | 23.8 |
| Example 3 | 0.83 | 0.76 | 1.10 | 88.2 | 10.6 | 1.94 | 23.1 |
| Example 4 | 0.51 | 0.56 | 0.91 | 89.9 | 10.1 | 1.39 | 16.9 |
| Example 5 | 0.49 | 0.42 | 1.15 | 91.4 | 10.4 | 1.69 | 20.6 |
| Example 6 | 0.62 | 0.48 | 1.29 | 88.5 | 9.8 | 1.58 | 25.7 |
| Comparative Example 1 | 0.84 | 1.08 | 0.78 | 84.9 | 12.2 | 2.15 | 14.7 |
| Comparative Example 2 | 1.02 | 1.22 | 0.84 | 82.6 | 10.4 | 1.71 | 35.1 |
| Comparative Example 3 | 0.56 | 0.76 | 0.74 | 81.2 | 8.9 | 2.18 | 6.5 |
| Comparative Example 4 | 0.90 | 1.02 | 0.88 | 84.5 | 10.7 | 1.96 | 22.9 |
| Comparative Example 5 | 0.65 | 0.81 | 0.80 | 86.1 | 11.0 | 2.25 | 5.4 |

As shown in the above results, the initial charging and discharging efficiency in Examples 1 to 6 to which the invention was applied was as high as 88% or greater.

Meanwhile, all the results of the initial charging and discharging efficiency in Comparative Examples 1 to 5 to which the invention was not applied were below 88%.

<<SEM Observation of Precursor>>

Figure 2A:
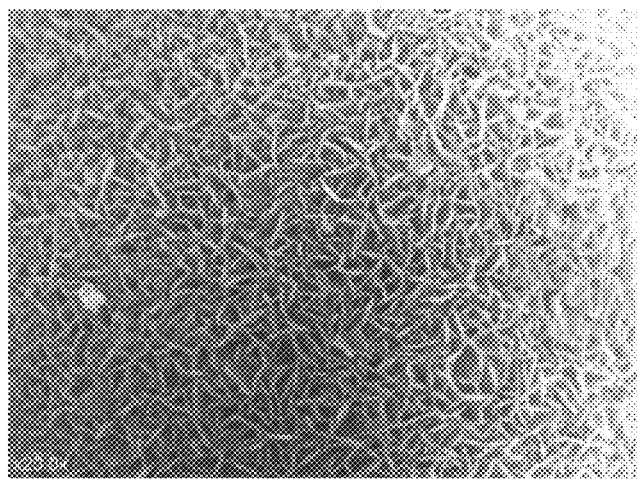
FIG. 2A is an SEM image of a precursor to which the invention is applied.
Figure 2B:
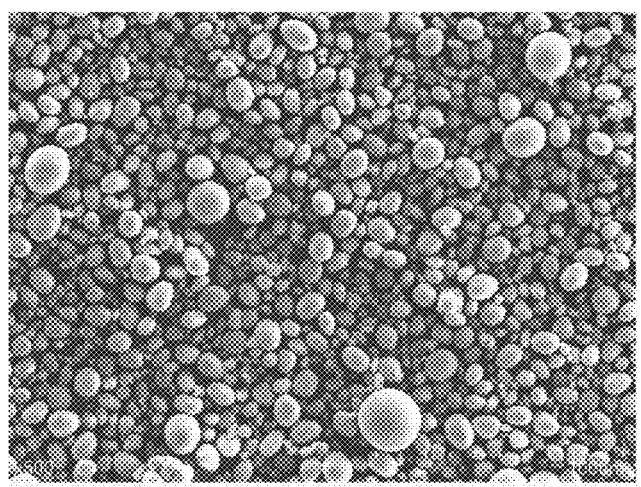
FIG. 2B is an SEM image of the precursor to which the invention is applied.

An SEM image of precursor particles in Example 5 will be shown in FIG. 2B, and an SEM image of the surfaces of the particles will be shown in FIG. 2A.

Figure 3A:
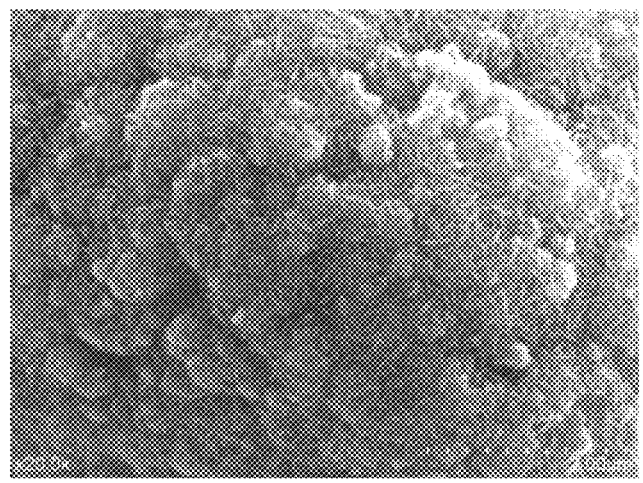
FIG. 3A is an SEM image of a precursor to which the invention is not applied.
Figure 3B:
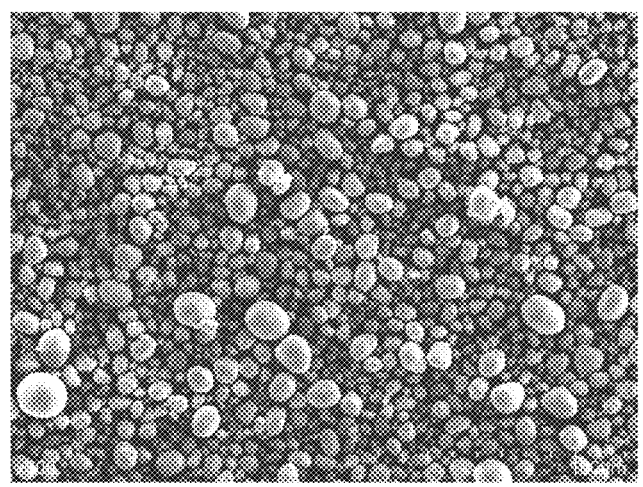
FIG. 3B is an SEM image of the precursor to which the invention is not applied.

An SEM image of precursor particles in Comparative Example 2 will be shown in FIG. 3B, and an SEM image of the surfaces of the particles will be shown in FIG. 3A. In comparison between FIG. 2A and FIG. 3A, it is possible to confirm that crystal regularly grew in the case in which the invention is applied. Therefore, it is possible to sufficiently expect that crystal regularly grows in the positive electrode active material for a lithium secondary battery manufactured using the precursor according to the invention.

INDUSTRIAL APPLICABILITY

According to the invention, it is possible to provide a positive electrode active material precursor for a lithium secondary battery that is used for manufacturing a positive electrode active material that is useful for a lithium secondary battery that exhibits high initial charging and discharging efficiency and a method for manufacturing a positive electrode active material for a lithium secondary battery using the precursor.

REFERENCE SIGNS LIST

1 Separator
2 Positive electrode
3 Negative electrode
4 Electrode group
5 Battery case
6 Electrolyte solution
7 Top insulator
8 Sealing body
10 Lithium secondary battery
21 Positive electrode lead
31 Negative electrode lead

What is claimed is:

1. A positive electrode active material precursor for a lithium secondary battery, wherein the positive electrode active material precursor is represented by the following composition formula (I), a BET specific surface area is equal to or greater than 16.9 m$^2$/g and equal to or less than 29.6 m$^2$/g, a ratio ($\alpha/\beta$) between a half width $\alpha$ of a peak that is present within a range of a diffraction angle 2$\theta$=19.2±1° and a half width $\beta$ of a peak that is present within a range of 2$\theta$=38.5±1° is equal to or greater than 0.9 in powder X-ray diffraction measurement using a CuK$\alpha$ beam:

$$Ni_xCo_yMn_zM_w(OH)_2 \qquad (I)$$

[0.7≤x<1.0, 0<y≤0.20, 0≤z≤0.20, 0≤w≤0.09, and x+y+z+w=1 are satisfied, and M is one or more selected from the group consisting of Mg, Ca, Sr, Ba, Ti, Zr, V, Nb, Cr, Mo, W, Fe, Ru, Cu, Zn, B, Al, Ga, Si, Sn, P, and Bi].

2. The positive electrode active material precursor for a lithium secondary battery according to claim 1, wherein a secondary particle diameter is equal to or greater than 7 μm and equal to or less than 13 μm.

3. The positive electrode active material precursor for a lithium secondary battery according to claim 1, wherein the positive electrode active material has a tap bulk density of 1.0 g/cm$^3$ or more and less than 1.9 g/cm$^3$.

* * * * *